(12) United States Patent
Dai et al.

(10) Patent No.: US 12,074,321 B2
(45) Date of Patent: Aug. 27, 2024

(54) CATHODE ACTIVE MATERIALS FOR LITHIUM ION BATTERIES

(71) Applicant: Apple Inc., Cupertino, CA (US)

(72) Inventors: Hongli Dai, Los Altos, CA (US);
Huiming Wu, San Jose, CA (US);
Chi-Kai Lin, Sunnyvale, CA (US);
Michael J. Erickson, San Jose, CA (US); Xiaoping Wang, Naperville, IL (US); Yan Li, Westmont, IL (US);
Yanjie Cui, Arlington Heights, IL (US);
James A. Gilbert, Bolingbrook, IL (US); Zhenzhen Yang, Westmont, IL (US); Anh D. Vu, Lemont, IL (US);
Arthur Jeremy Kropf, Westmont, IL (US); Hakim H. Iddir, Hoffman Estates, IL (US); Christopher S. Johnson, Naperville, IL (US); John David Carter, Bolingbrook, IL (US)

(73) Assignee: Apple Inc., Cupertino, CA (US)

( * ) Notice: Subject to any disclaimer, the term of this patent is extended or adjusted under 35 U.S.C. 154(b) by 254 days.

(21) Appl. No.: 16/999,328

(22) Filed: Aug. 21, 2020

(65) Prior Publication Data
US 2021/0057740 A1    Feb. 25, 2021

Related U.S. Application Data

(60) Provisional application No. 62/889,967, filed on Aug. 21, 2019.

(51) Int. Cl.
| | |
|---|---|
| *H01M 4/505* | (2010.01) |
| *C01G 53/00* | (2006.01) |
| *H01M 4/36* | (2006.01) |
| *H01M 4/48* | (2010.01) |
| *H01M 4/525* | (2010.01) |
| *H01M 10/0525* | (2010.01) |
| *H01M 4/02* | (2006.01) |

(52) U.S. Cl.
CPC .......... *H01M 4/505* (2013.01); *C01G 53/50* (2013.01); *H01M 4/366* (2013.01); *H01M 4/483* (2013.01); *H01M 4/525* (2013.01); *H01M 10/0525* (2013.01); *C01P 2004/84* (2013.01); *C01P 2006/40* (2013.01); *H01M 2004/028* (2013.01)

(58) Field of Classification Search
None
See application file for complete search history.

(56) References Cited

U.S. PATENT DOCUMENTS

| | | |
|---|---|---|
| 5,744,262 A | 4/1998 | Cheng et al. |
| 5,993,998 A | 11/1999 | Yasuda |
| 6,007,947 A | 12/1999 | Mayer |
| 6,077,496 A | 6/2000 | Hiraoka et al. |
| 6,677,082 B2 | 1/2004 | Thackeray et al. |
| 6,680,143 B2 | 1/2004 | Thackeray et al. |
| 6,805,996 B2 | 10/2004 | Hosoya |
| 6,878,487 B2 | 4/2005 | Cho et al. |
| 7,135,252 B2 | 11/2006 | Thackeray et al. |
| 7,179,565 B2 | 2/2007 | Okochi et al. |
| 7,205,072 B2 | 4/2007 | Kang et al. |
| 7,235,193 B2 | 6/2007 | Park et al. |
| 7,238,450 B2 | 6/2007 | Howard, Jr. et al. |
| 7,255,963 B2 | 8/2007 | Nagayama et al. |
| 7,314,682 B2 | 1/2008 | Thackeray et al. |
| 7,314,684 B2 | 1/2008 | Kang et al. |
| 7,435,402 B2 | 10/2008 | Kang et al. |
| 7,468,223 B2 | 12/2008 | Thackeray et al. |
| 7,655,361 B2 | 2/2010 | Kim et al. |
| 7,691,535 B2 | 4/2010 | Shiozaki et al. |
| 7,732,096 B2 | 6/2010 | Thackeray et al. |
| 7,754,384 B2 | 7/2010 | Patoux et al. |
| 7,897,674 B2 | 3/2011 | Zaghib |
| 7,923,149 B2 | 4/2011 | Hwang et al. |
| 8,148,011 B2 | 1/2012 | Thackeray et al. |
| 8,187,746 B2 | 5/2012 | Chen et al. |
| 8,206,852 B2 | 6/2012 | Chang et al. |
| 8,277,683 B2 | 10/2012 | Deng et al. |
| 8,337,727 B2 | 12/2012 | Chen et al. |
| 8,343,663 B2 | 1/2013 | Jung et al. |
| 8,383,077 B2 | 2/2013 | Thackeray et al. |

(Continued)

FOREIGN PATENT DOCUMENTS

| | | |
|---|---|---|
| CN | 1588675 | 3/2005 |
| CN | 1702891 | 11/2005 |

(Continued)

OTHER PUBLICATIONS

Amiruddin et al.; "Electrochemical Characterization of Cathode Material (Li[Ni0.8Co0.1Mn0.1]O2 as Core and Li[Ni0.5-0.5xCoxMn0.5-0.5x]O2 as shell)for Lithium-Ion Batteries"; ECS Meeting Abstracts; Electrochemical Society; No. 240; 2007; one page.

Yuping et al.; "Lithium Ion Batteries—Applications and Practices"; Chapter 5 Cobalt Lithium Oxide Cathode Materials; Chemical Industry Press; Jan. 2012; 4 pages.

Zhao et al., "Progress of Research on the Li-rich Cathode Materials xLi2MnO3(1-x)LiMO2(M+Co, Fe, Ni1/2Mn1/2 . . . ) for Li-ion Batteries," Journal of Inorganic Materials, vol. 26(7), pp. 673-679, Jul. 2011.

Lee et al., "Characteristics of LiCoO2 and Its Precursor Synthesized by a Uniform Precipitation Method," Electrochemical and Solid-State Letters, 2010, vol. 13, No. 7, pp. A81-A84.

Kobayashi et al., "Study on the Crystal and Electronic Structures of the Layered Li2Mo3—LiMo2 Materials in Li De-Intercalation Process," *Photon Factory Activity Report*, 2012, vol. 29, No. 2011, 1 pp.

(Continued)

*Primary Examiner* — Carlos Barcena
(74) *Attorney, Agent, or Firm* — BakerHostetler

(57) ABSTRACT

Compounds, particles, and cathode active materials that include lithium, cobalt, manganese, nickel, aluminum, and other elements can be used in lithium ion batteries. The cathode active materials include compounds having the general Formula (I): compound represented by Formula (I): $Li_\alpha CO_{1-x-y-z}Me_w Mn_x Ni_y Al_z O_\delta$, as well as Formula (II): $Li_\alpha CO_{1-s-u-v}Me_s Mn_t Ni_u Al_v O_\delta$.

38 Claims, 4 Drawing Sheets

(56) References Cited

U.S. PATENT DOCUMENTS

| | | |
|---|---|---|
| 8,535,832 B2 | 9/2013 | Karthikeyan et al. |
| 8,801,960 B2 | 8/2014 | Ueda et al. |
| 8,802,290 B2 | 8/2014 | Li et al. |
| 9,166,222 B2 | 10/2015 | Amiruddin et al. |
| 9,716,265 B2 | 7/2017 | Dai et al. |
| 9,843,041 B2 | 12/2017 | Lopez et al. |
| 10,084,187 B2 | 9/2018 | Dai et al. |
| 10,128,494 B2 | 11/2018 | Dai et al. |
| 10,141,572 B2 | 11/2018 | Wu et al. |
| 10,164,256 B2 | 12/2018 | Wu et al. |
| 10,297,821 B2 | 5/2019 | Dai et al. |
| 10,297,823 B2 | 5/2019 | Dai et al. |
| 10,347,909 B2 | 7/2019 | Dai et al. |
| 10,593,941 B2 | 3/2020 | Dai et al. |
| 10,597,307 B2 | 3/2020 | Dai et al. |
| 10,615,413 B2 | 4/2020 | Dai et al. |
| 2002/0061444 A1 | 5/2002 | Kweon et al. |
| 2002/0114995 A1 | 8/2002 | Thackeray |
| 2002/0136954 A1 | 9/2002 | Thackeray |
| 2002/0182504 A1 | 12/2002 | Imachi et al. |
| 2003/0013017 A1 | 1/2003 | Nagayama et al. |
| 2003/0039886 A1 | 2/2003 | Zhang et al. |
| 2003/0054250 A1 | 3/2003 | Kweon et al. |
| 2003/0073002 A1 | 4/2003 | Imachi et al. |
| 2003/0082445 A1 | 5/2003 | Smieth et al. |
| 2003/0134200 A1 | 7/2003 | Tanaka et al. |
| 2004/0029008 A1 | 2/2004 | Winterberg |
| 2004/0191633 A1 | 9/2004 | Johnson et al. |
| 2004/0201948 A1 | 10/2004 | Hosoya et al. |
| 2004/0213729 A1 | 10/2004 | Suhara et al. |
| 2004/0253516 A1 | 12/2004 | Yuasa et al. |
| 2004/0258836 A1 | 12/2004 | Besenhard et al. |
| 2005/0026040 A1 | 3/2005 | Thackeray |
| 2005/0074675 A1 | 4/2005 | Nishijima et al. |
| 2005/0130042 A1 | 6/2005 | Liu et al. |
| 2005/0136329 A1 | 6/2005 | Howard, Jr. et al. |
| 2005/0181279 A1 | 8/2005 | Hosoya |
| 2005/0265909 A1 | 12/2005 | Kajiya et al. |
| 2005/0271948 A1 | 12/2005 | Kang |
| 2006/0024584 A1 | 2/2006 | Kim et al. |
| 2006/0068293 A1 | 3/2006 | Kim et al. |
| 2006/0081818 A1 | 4/2006 | Ito et al. |
| 2006/0088767 A1 | 4/2006 | Li et al. |
| 2006/0099508 A1 | 5/2006 | Thackeray et al. |
| 2006/0159994 A1 | 7/2006 | Dahn et al. |
| 2006/0177739 A1 | 8/2006 | Endo et al. |
| 2006/0194118 A1 | 8/2006 | Yew et al. |
| 2006/0240326 A1 | 10/2006 | Lee |
| 2007/0048619 A1 | 3/2007 | Inda |
| 2007/0072086 A1 | 3/2007 | Nakagawa |
| 2007/0117014 A1 | 5/2007 | Saito et al. |
| 2007/0122705 A1 | 5/2007 | Paulsen et al. |
| 2007/0141469 A1 | 6/2007 | Tokunaga et al. |
| 2007/0172739 A1 | 7/2007 | Visco |
| 2007/0202407 A1 | 8/2007 | Eberman et al. |
| 2007/0264573 A1 | 11/2007 | Yamada et al. |
| 2007/0292761 A1 | 12/2007 | Park et al. |
| 2008/0057401 A1 | 3/2008 | Mori et al. |
| 2008/0090150 A1 | 4/2008 | Nakura |
| 2008/0118836 A1 | 5/2008 | Hwang et al. |
| 2008/0118847 A1 | 5/2008 | Jung et al. |
| 2008/0131778 A1 | 6/2008 | Watanabe et al. |
| 2008/0131781 A1 | 6/2008 | Yong et al. |
| 2008/0160415 A1 | 7/2008 | Wakita et al. |
| 2008/0268339 A1 | 10/2008 | Suzuki |
| 2008/0280205 A1 | 11/2008 | Jiang et al. |
| 2008/0311473 A1 | 12/2008 | Sasaoka et al. |
| 2008/0318131 A1 | 12/2008 | Watanabe et al. |
| 2009/0092903 A1 | 4/2009 | Johnson et al. |
| 2009/0146115 A1 | 6/2009 | Xiao et al. |
| 2009/0200510 A1 | 8/2009 | Watanabe et al. |
| 2009/0202905 A1 | 8/2009 | Morita et al. |
| 2009/0239148 A1 | 9/2009 | Jiang |
| 2010/0055567 A1 | 4/2010 | Nakai et al. |
| 2010/0086853 A1 | 4/2010 | Venkatachalam et al. |
| 2010/0086854 A1 | 4/2010 | Kumar et al. |
| 2010/0151332 A1 | 6/2010 | Lopez et al. |
| 2010/0173197 A1 | 7/2010 | Li et al. |
| 2010/0304225 A1 | 12/2010 | Pascaly et al. |
| 2011/0014518 A1 | 1/2011 | Nakai et al. |
| 2011/0017529 A1 | 1/2011 | Kumar et al. |
| 2011/0031437 A1 | 2/2011 | Nagase et al. |
| 2011/0052981 A1 | 3/2011 | Lopez et al. |
| 2011/0053001 A1 | 3/2011 | Babic et al. |
| 2011/0065006 A1 | 3/2011 | Ogasa |
| 2011/0076556 A1 | 3/2011 | Karthikeyan et al. |
| 2011/0076564 A1 | 3/2011 | Yu et al. |
| 2011/0081578 A1 | 4/2011 | Chang et al. |
| 2011/0089369 A1 | 4/2011 | Patoux et al. |
| 2011/0111294 A1 | 5/2011 | Lopez et al. |
| 2011/0111298 A1 | 5/2011 | Lopez et al. |
| 2011/0121240 A1 | 5/2011 | Amine et al. |
| 2011/0136019 A1 | 6/2011 | Amiruddin et al. |
| 2011/0143174 A1 | 6/2011 | Kim |
| 2011/0165463 A1 | 7/2011 | Chang et al. |
| 2011/0165474 A1 | 7/2011 | Im et al. |
| 2011/0171371 A1 | 7/2011 | Li et al. |
| 2011/0171539 A1 | 7/2011 | Patoux et al. |
| 2011/0200864 A1 | 8/2011 | Dai |
| 2011/0200880 A1 | 8/2011 | Yu |
| 2011/0223492 A1 | 9/2011 | Sakitani et al. |
| 2011/0244331 A1 | 10/2011 | Karthikeyan et al. |
| 2011/0269018 A1 | 11/2011 | Kono et al. |
| 2011/0294006 A1 | 12/2011 | Amine et al. |
| 2011/0294019 A1 | 12/2011 | Amine et al. |
| 2012/0015250 A1 | 1/2012 | Teng et al. |
| 2012/0028134 A1 | 2/2012 | Kim et al. |
| 2012/0040247 A1 | 2/2012 | Manivannan et al. |
| 2012/0168696 A1 | 5/2012 | Huang et al. |
| 2012/0196176 A1 | 8/2012 | He et al. |
| 2012/0258369 A1 | 10/2012 | Yokoyama et al. |
| 2012/0282522 A1 | 11/2012 | Axelbaum et al. |
| 2012/0295155 A1 | 11/2012 | Deng et al. |
| 2013/0004826 A1 | 1/2013 | Li et al. |
| 2013/0011738 A1 | 1/2013 | Zhou |
| 2013/0101893 A1 | 4/2013 | Dai et al. |
| 2013/0149604 A1 | 6/2013 | Fujiki et al. |
| 2013/0252107 A1 | 9/2013 | Lee et al. |
| 2013/0260249 A1 | 10/2013 | Choi |
| 2013/0344391 A1 | 12/2013 | Yushin et al. |
| 2014/0087065 A1 | 3/2014 | Li et al. |
| 2014/0087254 A1 | 3/2014 | Li et al. |
| 2014/0087256 A1 | 3/2014 | Li et al. |
| 2014/0087261 A1 | 3/2014 | Li et al. |
| 2014/0141331 A1 | 5/2014 | Lee et al. |
| 2014/0158932 A1 | 6/2014 | Sun et al. |
| 2014/0175329 A1 | 6/2014 | Palma et al. |
| 2014/0193693 A1 | 7/2014 | Hoshina et al. |
| 2014/0234715 A1 | 8/2014 | Fasching et al. |
| 2014/0272563 A1 | 9/2014 | Dai et al. |
| 2015/0010819 A1 | 1/2015 | Lee et al. |
| 2015/0140421 A1 | 5/2015 | Ihara et al. |
| 2015/0171423 A1 | 6/2015 | Kim et al. |
| 2015/0180024 A1 | 6/2015 | Nose |
| 2015/0188144 A1 | 7/2015 | Shin et al. |
| 2015/0243971 A1 | 8/2015 | Cho et al. |
| 2015/0243984 A1 | 8/2015 | Kase et al. |
| 2015/0303519 A1 | 10/2015 | Hanazaki |
| 2015/0311522 A1 | 10/2015 | Fang et al. |
| 2016/0036043 A1 | 2/2016 | Dai et al. |
| 2016/0133929 A1 | 5/2016 | Hah et al. |
| 2016/0156032 A1 | 6/2016 | Lee et al. |
| 2016/0260965 A1 | 9/2016 | Wu et al. |
| 2016/0293941 A1 | 10/2016 | Yamasaki et al. |
| 2016/0315315 A1 | 10/2016 | Olken et al. |
| 2016/0351973 A1 | 12/2016 | Albano et al. |
| 2017/0018767 A1 | 1/2017 | Park et al. |
| 2017/0092949 A1 | 3/2017 | Dai et al. |
| 2017/0133678 A1 | 5/2017 | Ozoemena et al. |
| 2017/0155145 A1* | 6/2017 | Kusachi ............... H01M 4/525 |
| 2017/0187071 A1 | 6/2017 | Wang et al. |
| 2017/0187072 A1 | 6/2017 | Wang et al. |
| 2017/0214045 A1 | 7/2017 | Dai et al. |
| 2017/0263917 A1 | 9/2017 | Dai et al. |

(56) References Cited

U.S. PATENT DOCUMENTS

| | | |
|---|---|---|
| 2017/0263928 A1 | 9/2017 | Dai et al. |
| 2017/0263929 A1 | 9/2017 | Wu et al. |
| 2017/0279162 A1 | 9/2017 | Vissers et al. |
| 2017/0346082 A1 | 11/2017 | Dai et al. |
| 2018/0062156 A1 | 3/2018 | Wu et al. |
| 2018/0079655 A1 | 3/2018 | Dai et al. |
| 2018/0083277 A1 | 3/2018 | Dai et al. |
| 2018/0083278 A1 | 3/2018 | Dai et al. |
| 2018/0114983 A9 | 4/2018 | Dai et al. |
| 2018/0114984 A9 | 4/2018 | Wu et al. |
| 2018/0123117 A9 | 5/2018 | Dai et al. |
| 2018/0215629 A1 | 8/2018 | Honma et al. |
| 2018/0257947 A9 | 9/2018 | Dai et al. |
| 2018/0294522 A1 | 10/2018 | Dai et al. |
| 2018/0331360 A1 | 11/2018 | Meng et al. |
| 2018/0351173 A1 | 12/2018 | Dai et al. |
| 2019/0027747 A9 | 1/2019 | Dai et al. |
| 2019/0051893 A1 | 2/2019 | Zhang et al. |
| 2019/0067686 A1 | 2/2019 | Dai et al. |
| 2019/0074514 A1 | 3/2019 | Wu et al. |
| 2020/0035991 A1 | 1/2020 | Wang et al. |
| 2020/0044242 A1 | 2/2020 | Wang et al. |
| 2020/0058933 A1 | 2/2020 | Wu et al. |
| 2020/0075951 A1 | 3/2020 | Dai et al. |
| 2020/0189930 A1 | 6/2020 | Dai et al. |
| 2020/0259208 A1 | 8/2020 | Yamamoto |
| 2020/0266435 A1 | 8/2020 | Dai et al. |
| 2020/0358093 A1 | 11/2020 | Oshita et al. |

FOREIGN PATENT DOCUMENTS

| | | |
|---|---|---|
| CN | 1770514 | 10/2006 |
| CN | 101083321 | 12/2007 |
| CN | 101088918 | 12/2007 |
| CN | 101150190 | 3/2008 |
| CN | 101223660 | 7/2008 |
| CN | 101284681 | 10/2008 |
| CN | 101304090 | 11/2008 |
| CN | 101355161 | 1/2009 |
| CN | 101510603 | 8/2009 |
| CN | 101694877 | 4/2010 |
| CN | 101734728 | 6/2010 |
| CN | 102110808 | 6/2011 |
| CN | 102195094 A | 9/2011 |
| CN | 102299299 | 12/2011 |
| CN | 102332585 | 1/2012 |
| CN | 102368548 | 3/2012 |
| CN | 101789499 | 4/2012 |
| CN | 102439765 A | 5/2012 |
| CN | 102479947 | 5/2012 |
| CN | 102484249 | 5/2012 |
| CN | 102544575 | 7/2012 |
| CN | 102646831 | 8/2012 |
| CN | 102683666 | 9/2012 |
| CN | 102723459 | 10/2012 |
| CN | 102751481 | 10/2012 |
| CN | 102881891 | 1/2013 |
| CN | 103151520 | 6/2013 |
| CN | 103296249 | 9/2013 |
| CN | 102386381 | 1/2014 |
| CN | 103560250 | 2/2014 |
| CN | 103606674 | 2/2014 |
| CN | 103682311 | 3/2014 |
| CN | 103872302 | 6/2014 |
| CN | 103872315 | 6/2014 |
| CN | 103972493 | 8/2014 |
| CN | 104022280 | 9/2014 |
| CN | 104201323 | 12/2014 |
| CN | 104300138 | 1/2015 |
| CN | 104466099 | 3/2015 |
| CN | 104577128 | 4/2015 |
| CN | 104868122 | 8/2015 |
| CN | 104966833 A | 10/2015 |
| CN | 105161710 | 12/2015 |
| CN | 105895909 A | 8/2016 |
| CN | 106450211 | 2/2017 |
| DE | 10352063 | 6/2005 |
| JP | 4-267053 | 9/1992 |
| JP | H-10-087327 | 4/1998 |
| JP | 2001-167763 A | 6/2001 |
| JP | 2001-319652 A | 11/2001 |
| JP | 2002-201028 | 7/2002 |
| JP | 2004-047180 A | 2/2004 |
| JP | 2005-101003 | 4/2005 |
| JP | 2005-149867 | 6/2005 |
| JP | 2005-289700 | 10/2005 |
| JP | 2005-302507 A | 10/2005 |
| JP | 2006-173137 A | 6/2006 |
| JP | 2006-344509 | 12/2006 |
| JP | 2007-091502 | 4/2007 |
| JP | 2007-517368 | 6/2007 |
| JP | 2007-173113 | 7/2007 |
| JP | 2009-4311 | 1/2009 |
| JP | 2009-217981 | 9/2009 |
| JP | 2010-541166 | 12/2010 |
| JP | 2011-105594 | 6/2011 |
| JP | 2011-113869 | 6/2011 |
| JP | 2013-180917 | 9/2013 |
| JP | 5369568 B2 | 12/2013 |
| JP | 2015-213038 | 11/2015 |
| JP | 2016-517615 A | 6/2016 |
| JP | 2017-191738 | 10/2017 |
| KR | 10-2002-0063501 | 8/2002 |
| KR | 10-2005-0121727 | 12/2005 |
| KR | 10-2014-0073856 | 6/2014 |
| KR | 10-2014-0108615 | 9/2014 |
| KR | 2016-0010313 A | 1/2016 |
| KR | 101731473 | 4/2017 |
| TW | 201126798 | 8/2011 |
| TW | 201311545 A | 3/2013 |
| TW | 201342695 | 10/2013 |
| WO | WO 2003/049216 A1 | 6/2003 |
| WO | WO 2003/081698 A1 | 10/2003 |
| WO | WO 2004/045015 | 5/2004 |
| WO | WO 2004/102700 A1 | 11/2004 |
| WO | WO 2004/107480 | 12/2004 |
| WO | WO 2008/069351 | 6/2008 |
| WO | WO 2009/120515 | 10/2009 |
| WO | WO 2010/011569 | 1/2010 |
| WO | WO 2010/139404 | 12/2010 |
| WO | WO 2011/020073 | 2/2011 |
| WO | WO 2011/054441 | 5/2011 |
| WO | WO 2013/048048 | 4/2013 |
| WO | WO 2014/014913 | 1/2014 |
| WO | WO 2014/119165 | 8/2014 |
| WO | WO 2016/143572 | 9/2016 |
| WO | WO-2019211366 A1 * | 11/2019 ......... H01M 10/052 |

OTHER PUBLICATIONS

Giordano et al., "Metal Nitride and Metal Carbide Nanoparticles by a Soft Urea Pathway," *Chem. Mater.*, 2009, vol. 21, pp. 5136-5144.

Dou et al., "Synthesis and electrochemical properties of layered LiNi0.5-xMn0.5-xCo2xO2 for lithium-ion battery from nickel manganese cobalt precursor," *J Solid State Electrochem*, (2011), vol. 15, pp. 399-404.

Li, "Layered Oxides Li1+xM1-xO2 (M=Ni, Mn, Co, Al) As Cathode Materials for Rechargeable Lithium Ion Batteries," Dissertation, Submitted in partial fulfillment of the requirements for the degree of Doctor of Philosophy in Materials Science and Engineering in the Graduate School of Binghamton University State University of New York, Jul. 22, 2011, Published by UMI Dissertation Publishing, UMI No. 3474185, 158 pages.

Hu et al., "Ni, Mn—Co doped High-Voltage LiCoO2 Cathode Material for Lithium Ion Batteries," Chinese Journal of Inorganic Chemistry, 2015, vol. 31, Issue 1, pp. 159-165.

Rodrigues et al., "A novel coprecipitation method towards the synthesis of NiXMnXCo(1-2X)(OH)2 for the preparation of lithium metal oxides," *J Solid State Electrochem*, 2012, vol. 16, pp. 1121-1132.

Cho et al., "LiCoO2 Cathode Material That Does Not Show a Phase Transition from Hexagonal to Monoclinic Phase," 2001, *Journal of The Electrochemical Society*, vol. 148, No. 10, pp. A1110-A1115.

(56) References Cited

OTHER PUBLICATIONS

Jung et al., "Enhanced Stability of LiCoO2 Cathodes in Lithium-Ion Batteries Using Surface Modification by Atomic Layer Deposition," 2010, *Journal of The Electrochemical Society*, vol. 157, No. 1, pp. A75-A81.

Koyama et al., "First principles study of dopant solubility and defect chemistry in Li CoO2," *J. Mater. Chem A.*, 2014, vol. 2, pp. 11235-11245.

Arunkumar et al., "Chemical and structural instability of the chemically delithiated (1-z) Li[Li$_{1/3}$Mn$_{frax;2;3}$O$_2$ (z) Li[Co$_{1-y}$Ni$_y$]O$_2$ (0≤y≤1 and 0≤z≤1) solid solution cathodes," *Journal of Materials Chemistry*, 2008, vol. 18, pp. 190-198.

Sun et al., "The Role of AlF3 Coatings in Improving Electrochemical Cycling of Li-Enriched Nickel-Manganese Oxide Electrodes for Li-Ion Batteries," *Adv. Mater.*, 2012, vol. 24, pp. 1192-1196.

Robertson et al., "Layered Li$_x$Mn$_{1-y}$Co$_y$O$_2$ Intercalation Electrodes—Influence of Ion Exchange on Capacity and Structure upon Cycling," *Chem. Mater.*, 2001, vol. 13, pp. 2380-2386.

Patoux et al., "Layered Manganese Oxide Intergrowth Electrodes for Rechargeable Lithium Batteries. 2. Substitution with Al," *Chem. Mater.*, 2005, vol. 17, pp. 1044-1054.

Myung et al., "Role of Alumina Coating on Li—Ni—Co—Mn—O Particles as Positive Electrode Material for Lithium-Ion Batteries," *Chem. Mater.*, 2005, vol. 17, pp. 3695-3704.

Wang et al., "Synthesis of Li$_2$MnO$_3$-stabilized LiCoO$_2$ cathode material by spray-drying method and its high voltage performance," *Journal of Alloys and Compounds*, 2015, vol. 626, pp. 228-233.

Zeng et al., "Cation ordering in Li[NixMnxCo(1-2x)]O-2-layered cathode materials: A nuclear magnetic resonance (NMR), pair distribution function, X-ray absorption spectroscopy, and electrochemical study," *Chemistry of Materials*, 2007, vol. 19. No. 25, pp. 6277-6289.

Zeng et al, "Investigation of the Structural Changes in Li[NiyMnyCo(1-2y]O-2 (y=0.05) upon Electrochemical Lithium Deintercalation," *Chemistry of Materials*, 2010, vol. 22, No. 3, pp. 1209-1219.

Saadoune et al., "LiNi0.1Mn0.1Co0.8O2 electrode material: Structural changes upon lithium electrochemical extraction," *Electrochimica Acta*, 2010, vol. 55, No. 18, pp. 5180-5185.

Bentaleb et al., "On the LiNi0.2Mn0.2Co0.6O2 positive electrode material," *Journal of Power Sources*, 2010, vol. 195, No. 5, pp. 1510-1515.

Ben Kamel et al., "Local Structure and electrochemistry of LiNiyMnyCo1-2y)O2 electrode materials for Li-ion batteries," *Ionics*, 2008, vol. 14, No. 2, pp. 89-97.

Stoyanova et al., "High-Frequency Electron Paramagnetic Resonance Analysis of the Oxidation State and Local Structure of Ni and Mn Ions in Ni,Mn-Codoped LiCoO2," *Inorganic Chemistry*, 2010, vol. 49, No. 4, pp. 1932-1941.

Menetrier et al., "The insulator-metal transition upon lithium deintercalation from LiCoO2: electronic properties and Li-7 NMR Study," *Journal of Materials Chemistry*, 1999, vol. 9, No. 5, pp. 1135-1140.

Iddir et al., "Stability of Li- and Mn-Rich Layered-Oxide Cathodes within the First-Charge Voltage Plateau," *Journal of the Electrochemical Society*, 2016, vol. 163, No. 8, pp. A1784-A1789.

Seong-Min Bak et al, "Structural Changes and Thermal Stability of Charged LiNixMnyCozO2 Cathode Materials Studied by Combined In Situ Time-Resolved XRD and Mass Spectroscopy," *ACS Appl. Mater. Interfaces*, 2014, vol. 6, pp. 22594-22601.

Nam et al. "Ammonia-free coprecipitation synthesis of a Ni—Co—Mn hydroxide precursor for high-performance battery cathode materials," *Green Chemistry*, 2015. vol. 17, pp. 1127.

Xie et al., "An improved continuous co-precipitation method to synthesize LiNi0.80Co0.15Al0.05O2 cathode material," *Journal of Alloys and Compounds*, 2016, vol. 666, pp. 84-87.

Rouse et al., "Electrochemical Studies of Single Crystals of Lithiated Nickel Oxide," *Journal of The Electrochemical Society*, Feb. 1966, vol. 113, No. 2, pp. 184-190.

Jin et al., "Observation of Bulk Superconductivity in Na$_x$CoO$_2$•yH$_2$O and Na$_x$CoO$_2$•yD$_2$O Powder and Single Crystals," *Phys Rev Lett*, 2008, vol. 91, Issue 21, id. 217001, 4 pages.

Franger et al., "Chemistry and Electrochemistry of Low-Temperature Manganese Oxides as Lithium Intercalation Compounds," *Journal of The Electrochemical Society*, 2000, vol. 147, No. 9, pp. 3226-3230.

Lu et al., "Layered Li[Ni$_x$Co$_{1-2x}$Mn$_x$]O$_2$ Cathode Materials for Lithium-Ion Batteries," *Electrochemical and Solid-State Letters*, 2001, vol. 4, No. 12, pp. A200-A203.

Shinova et al., "Cationic distribution and electrochemical performance of LiCo$_{1/3}$Ni$_{1/3}$Mn$_{1/3}$O$_2$ electrodes for lithium-ion batteries," 2008, *Solid State Ionics*, vol. 179, pp. 2198-2208.

Qian et al., "Lithium Lanthanum Titanium Oxides: A Fast Ionic Conductive Coating for Lithium-Ion Battery Cathodes," *Chemistry of Materials*, 2012, 24 (14), pp. 2744-2751.

Reddy et al., "Effects of LLTO coating on high temperature cycle life performance of LiMn2O4 cathode material," Abstract #382, 2012, The Electrochemical Society, 2 pages.

Davison et al., "Low Cost, Novel Methods for Fabricating All-Solid-State Lithium Ion Batteries," A Major Qualifying Project Submitted to the Faculty of Worcester Polytechnic Institute, Apr. 23, 2012, 126 pages.

Lee et al., "The Effects of Li—La—Ti—O Coating on the Properties of Li[Ni0.3Co0.4Mn0.3]O2 Cathode Material," Journal of the Korean Institute of Electrical and Electronic Material Engineers, Oct. 2009, vol. 22, No. 10, pp. 890-896.

Lee et al., "The Effect of Coating Thickness on the Electrochemical Properties of a Li—La—Ti—O-coated Li[Ni0.3Co0.4Mn0.3]O2 Cathode," *Bull. Korean Chem. Soc.*, 2010, vol. 31, No. 11, pp. 3233-3237.

Hu et al., "Enhanced electrochemical performance of LiMn2O4 cathode with a Li0.34La0.51TiO3-caoted layer," *RSC Advances*, 2015. vol. 5, pp. 17592-17600.

Fergus et al., "Recent Developments in Cathode Materials for Lithium Ion Batteries," *Journal of Power Sources*, Vo. 195, No. 4, 23010, pp. 939-954.

Gille G. et al., "Cathode Materials for Rechargeable Batteries-Preparation, Structure-Property Relationships and Performance," *Solid State Ionics*, Vo. 148, No. 3-4, 2002, pp. 269-282.

Periasamy et al., "High Voltage and High Capacity Characteristics of LiNi1/3Co1/3Mn1/3O2 Cathodes for Lithium Battery Applications," *Int. J. Electrochecm Soc.*, vol. 2, 2007, pp. 689-699.

Manthiram Lab Highlights, "Passivation of Spinel Cathode Surface through Self-Segregarion of Iron," May 7, 2010.

Cerion Power, "Our Power Business," www.cerionenterprises.com/companies_and_applications/power, accessed Sep. 8, 2011.

ETV Motors, "High5ive advanced high-voltage cells," www.etvemotors.com/advanced-battery.htm, accessed Sep. 8, 2011.

Wolfenstine et al., US Army RDECOM, "High Cycle Life Cathode for High Voltage (5V) Lithium Ion Batteries."

Sullivan, "Safe High Voltage Cathode Materials for Pulsed Power Applications," Navy STTR FY2011A—Topic N11A-T035, www.navy.sbir.com/n11_A/navst11-035.htm, accessed Sep. 8, 2011.

Xu, US Army RDECOM, "Electrolyte for Next Generation 5V Li-Ion Batteries."

Ghosh et al., "Block Copolymer Solid Battery Electrolyte with High Li-Ion Transference Number," *Journal of the Electrochemical Society*, 2010, vol. 157, No. 7, pp. A846-A849.

Abu-Lebdeh et al., High-Voltage Electrolytes Based on Adiponitrile for Li-Ion Batteries, *Journal of the Electrochemical Society*, 2009, vol. 156, No. 1, pp. A60-A65.

Jow et al., "High Voltage Electrolytes for Li-ion Batteries," U.S. Research Laboratory, Presentation, May 2011.

Lucht, University of Rhode Island, "Development of Electrolytes for Lithium-ion Batteries," Presentation, May 11, 2001.

Zhang et al., Argonne National Laboratory, Vehicle Technologies Program Annual Merit Review and Peer Evaluation Meeting, "High Voltage Electrolyte for Lithium Batteries," Presentation, Jun. 9-13, 2011.

David Howell, US Department of Energy, "Vehicle Technologies Program," 2011 Annual Merit Review and Peer Evaluation Meeting, Presentation, May 9-13, 2011.

Fey et al., Preparation and electrochemical properties of high-voltage cathode maters, LiMyNi0.5-yMn1.5O4 (M=Fe, Cu, Al, Mg; y=0.0-0.4), *Journal of Power Sources*, 2003, vol. 115, pp. 332-345.

(56) References Cited

OTHER PUBLICATIONS

Kawai et al., "High-voltage lithium cathode materials," Journal of Power Sources, 1999, vols. 81-82, abstract only.

Huang et al., "Lithium cobalt phosphate: a high voltage lithium ion cathode material," Valence Technologies.

"Award Details," SBIR/STTR, www.sbir.gov/sbirsearch/detail/233700, accessed Sep. 8, 2011.

Ju et al., "LiCo1-xAlxO2 (0≤x≤0.05) cathode powders prepared from the nanosized Co1-xAlxOy precursor powders," Materials Chemistry and Physics, 112 (2008), pp. 536-541.

Wu et al., "Effect of Al3+ and F-Doping on the Irreversible Oxygen Loss from Layered Li[Li0.17Mn0.58Ni0.25]O2 Cathodes," Electrochemical and Solid-State Letters, 2007, vol. 10, No. 6, pp. A151-A154.

Li et al., "Effects of fluorine doping on structure, surface chemistry, and electrochemical performance of LiNi0.8Co0.15Al0.05O2," Electrochimica Acta, 2015, vol. 174, pp. 1122-1130.

Cho et al., "Exploring Lithium Deficiency in Layered Oxide Cathode for Li-Ion Battery," Advanced Sustainable Systems, 2017, 1700026, 10 pages.

Lee et al., "Surface modification of LiNi0.5Mn1.5O4 cathodes with ZnAl2O4 by a sol-gel method for lithium ion batteries," Electrochimica Acta, 2014, vol. 115, pp. 326-331.

Kim et al., "Effect of fluorine on Li[Ni1/3Co1/3Mn1/3]O2-zFz as lithium intercalation material," Journal of Power Sources, 2005, vol. 146, pp. 602-605.

Yue et al., "The enhanced electrochemical performance of LiNi0.6Co0.2Mn0.2O2 cathode materials by low temperature fluorine substitution," Electrochimica Acta, 2013, vol. 95, pp. 112-118.

Wang et al., "Effect of surface fluorine substitution on high voltage electrochemical performances of layered LiNi0.5Co0.2Mn0.3O2 cathode materials," Applied Surface Science, 2016, vol. 371, pp. 172-179.

Tang et al., "Synthesis and characterization of LifePO4 coating with aluminum doped zinc oxide," Trans. Nonferrous Met. Soc. China, 2013, vol. 23, pp. 451-455.

Myung et al., "Functionality of Oxide Coating for Li[Li0.05Ni0.4Co0.15Mn0.4])2 as Positive Electrode Materials for Lithium-Ion Secondary Batteries," J. Phys. Chem. C, 2007, vol. 111, pp. 4061-4067.

Liu et al., "Investigation the electrochemical performance of Li1.2Ni0.2Mn0.6O2 cathode material with ZnAl2O4 coating for lithium ion batteries," Journal of Alloys and Compounds, 2016, vol. 685, pp. 523-532.

Kim et al., "Improvement of High-Voltage Cycling Behavior of Surface-Modified Li[Ni⅓Co⅓Mn⅓]O2 Cathodes by Fluorine Substitution for Li-Ion Batteries," J. Electrochem. Soc., 2005, vol. 152, issue 9, pp. A1707-A1713.

Choi et al., "$^{27}$Al NMR Chemical Shifts in Oxide Crystals: A First-Principles Study," J. Phys. Chem. C, 2009, 113 (9), pp. 3869-3873.

Lee et al., "Solid-state NMR Studies of Al-doped and Al2O3-coated LiCoO2," Electrochimica Acta, Nov. 30, 2004, vol. 50, Issues 2-3, pp. 491-494.

Han et al., "Understanding the Role of Temperature and Cathode Composition on Interface and Bulk: Optimizing Aluminum Oxide Coatings for Li-Ion Cathodes," ACS Appl. Mater. Interfaces, 2017, 9 (17), pp. 14769-14778.

Chen et al., "Role of surface coating on cathode materials for lithium-ion batteries," Journal of Materials Chemistry, 2010, 20, 7606-7612.

Wenbin, Luo, "Effect of Al, Mg and Mn—Mg Doping on the Structure, Electrochemistry and Thermal Stability of LiCoO2 and LiNi⅓Mn⅓Co1/3O2," China Doctoral Dissertations Full-text Database Engineering Technology Part II, Nov. 15, 2010. (Translation provided by MultiLing).

Xinran, Cui, "Preparation and Properties of Al(3+) Doped Lithium-rich Layered Cathode Material Li[Co0.3Li0.23Mn0.47]O2," China Doctoral Dissertations Full-text Database Engineering Technology Part II, Oct. 15, 2012. (Translation provided by MultiLing).

Levasseur et al., "Evidence for structural defects in on-stoichiometric HT-LiCoO2: electrochemical, electronic properties and 7LI NMR studies," Solid State Ionics, 128 (2000), pp. 11-24.

Deng et al.; "Safety influences of the Al and Ti elements modified LiCoO2 materials on LiCoO2/graphite batteries under the abusive conditions"; Electrochimica Acta; vol. 295; 2019; p. 703-709.

"Cathode"; https://web.archive.org/web/20180309000906/http://lithiumionbattery.org:80/activities/cathode; Li-ion Battery; copyright 2017; accessed Jul. 12, 2023; 4 pages.

* cited by examiner

CATHODE ACTIVE MATERIALS FOR LITHIUM ION BATTERIES

CROSS-REFERENCES TO RELATED PATENT APPLICATIONS

This patent application claims the benefit under 35 U.S.C. § 119(e) of U.S. Patent Application Ser. No. 62/889,967, entitled "Cathode Active Materials For Lithium Ion Batteries," filed on Aug. 21, 2019, which is incorporated herein by reference in its entirety.

This patent application is related to the following patent applications, each of which is incorporated herein by reference in its entirety:

U.S. patent application entitled "Aluminum-Doped Lithium Cobalt Manganese Oxide Batteries," by Hongli Dai et al., filed on Aug. 21, 2020.

U.S. patent application entitled "Mono-Grain Cathode Materials," by Hongli Dai et al., filed on Aug. 21, 2020.

U.S. GOVERNMENT LICENSE RIGHTS

This invention was made with U.S. government support under WFO Proposal No. 85F59. This invention was made under a CRADA 1500801 between Apple Inc. and Argonne National Laboratory operated for the United States Department of Energy. The U.S. government has certain rights in the invention.

FIELD

This disclosure relates generally to batteries, and more particularly to cathode active materials for lithium-ion batteries.

BACKGROUND

As lithium ion battery-powered devices become increasingly smaller and more powerful, batteries powering these devices need to store more energy in a smaller volume. Consequently, use of battery-powered devices may be facilitated by mechanisms for improving the volumetric energy densities of batteries in the devices.

Lithium cobalt metal oxides or lithium transition metal oxides can be used in cathode active materials for lithium-ion batteries. The lithium transition metal oxides are derivations of lithium cobalt oxide. The lithium cobalt metal oxides or transition metal oxides can be in the form of powder.

SUMMARY

In some embodiments, a compound is represented by Formula (I):

$$Li_\alpha Co_{1-x-y-z}Me_w Mn_x Ni_y Al_z O_\delta \quad (I)$$

wherein $0.95 \leq \alpha \leq 1.05$, $0 < x \leq 0.050$, $0 < y \leq 0.040$, $0 < z \leq 0.070$, $0 \leq w \leq 0.020$, and $1.90 \leq \delta \leq 2.10$,
wherein Me is selected from Zr, Mg, Ti, and a combination thereof.

In some variations, the compound may include Al from $Al_2O_3$ coating.

In some variations, the compound may include Al from doping for a core.

In some variations, Me may be from an oxide coating.
In some variations, Me may be from doping for a core.
In some variations, x for Mn is from 0.010 to 0.035.
In some variations, x for Mn is from 0.010 to 0.025.
In some variations, x for Mn is from 0.010 to 0.015.
In some variations, x for Mn is from 0.005 to 0.015.
In some variations, y for Ni is from 0.010 to 0.030.
In some variations, y for Ni is from 0.010 to 0.025.
In some variations, y for Ni is from 0.010 to 0.020.
In some variations, y for Ni is from 0.010 to 0.015.
In some variations, z for Al is equal to or less than 0.055.
In some variations, z for Al is equal to or less than 0.035.
In some variations, z for Al is equal to or less than 0.015.
In some variations, w for Me is equal to or less than 0.015.
In some variations, w for Me is equal to or less than 0.010.
In some variations, w for Me is equal to or less than 0.005.
In some embodiments, a plurality of particles may include the compound.

In some embodiments, a cathode active material may include the plurality of particles.

In some embodiments, a cathode may include the cathode active material.

In some embodiments, a battery may include a cathode, a separator, and an anode.

In some embodiments, a particle may include a core comprising a compound of formula II:

$$Li_\alpha Co_{1-s-t-u-v}Me_s Mn_t Ni_u Al_v O_\delta \quad (II)$$

wherein Me is selected from Al, Zr, Mg, and Ti,
wherein $0.95 \leq \alpha \leq 1.05$, $0 < t \leq 0.050$, $0 < u \leq 0.040$, $0 < v \leq 0.050$, $0 \leq s \leq 0.020$, and $1.90 \leq \delta \leq 2.10$. The particle may also include a coating comprising an oxide selected from $Al_2O_3$, $ZrO_2$, MgO, $TiO_2$, and a combination thereof.

In some variations, Me or Al may be from a doping material for the core.

In some variations, t for Mn is from 0.010 to 0.035.
In some variations, t for Mn is from 0.010 to 0.025.
In some variations, t for Mn is from 0.010 to 0.015.
In some variations, t for Mn is from 0.005 to 0.015.
In some variations, u for Ni is from 0.010 to 0.030.
In some variations, u for Ni is from 0.010 to 0.025.
In some variations, u for Ni is from 0.010 to 0.020.
In some variations, u for Ni is from 0.010 to 0.015.
In some variations, v for Al is equal to or less than 0.035.
In some variations, v for Al is equal to or less than 0.025.
In some variations, v for Al is equal to or less than 0.015.
In some variations, w for Me is equal to or less than 0.010.
In some variations, w for Me is equal to or less than 0.05.

Additional embodiments and features are set forth in part in the description that follows, and will become apparent to those skilled in the art upon examination of the specification or may be learned by the practice of the disclosed subject matter. A further understanding of the nature and advantages of the disclosure may be realized by reference to the remaining portions of the specification and the drawings, which forms a part of this disclosure.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

The following description is presented to allow any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosure. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims. Thus, the disclosure is not limited to the embodiments shown, but is to be accorded the widest scope consistent with the principles and features disclosed herein.

The disclosure provides cathode active materials including Al, Mn, and Co. The particles have increased amount of Al diffused into each particle, and increased amount of Mn at the surface of each particle, as compared to aluminum oxide ($Al_2O_3$) surface coated particles. Batteries having cathodes that include these cathode active materials can demonstrate improved specific capacity, energy, and cell resistance cycle retention across operating temperatures. Embodiments of cathode active materials described herein can mitigate degradation mechanisms, yet allow for more lithium extraction and re-insertion.

In various aspects, the disclosure describes the positive effect of cathode active materials and particles comprising cathode active materials created by annealing at temperatures higher than 700° C. or 800° C. $Al_2O_3$ coating on increasing the Lithium ion cycle life when using the annealed material as a cathode in the secondary-battery. For high annealing temperatures, a co-pending patent application U.S. Provisional patent application entitled "Aluminum-Doped Lithium Cobalt Manganese Oxide Batteries," by Hongli Dai et al., filed on Aug. 21, 2019, is incorporated by reference in its entirety.

Battery Cells

Figure 1:
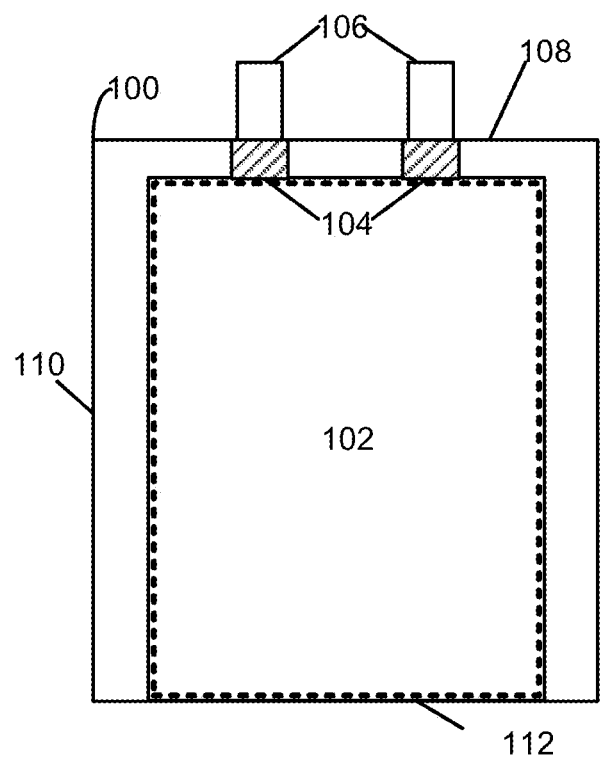
FIG. 1 presents a top-down view of a battery cell 100 in accordance with an embodiment.

FIG. 1 presents a top-down view of a battery cell 100 in accordance with an embodiment. The battery cell 100 may correspond to a lithium-ion or lithium-polymer battery cell that is used to power a device used in a consumer, medical, aerospace, defense, and/or transportation application. The battery cell 100 includes a stack 102 containing a number of layers that include a cathode with a cathode active material, a separator, and an anode with an anode active material. More specifically, the stack 102 may include one strip of cathode active material (e.g., aluminum foil coated with a lithium compound) and one strip of anode active material (e.g., copper foil coated with carbon). The stack 102 also includes one strip of separator material (e.g., conducting polymer electrolyte) disposed between the one strip of cathode active material and the one strip of anode active material. The cathode, anode, and separator layers may be left flat in a planar configuration or may be wrapped into a wound configuration (e.g., a "jelly roll"). Enclosures can include, without limitations, pouches, such as flexible pouches, rigid containers, and the like. Returning to FIG. 1, during assembly of the battery cell 100, the stack 102 can be enclosed in an enclosure. The stack 102 may be in a planar or wound configuration, although other configurations are possible.

The stack 102 can also include a set of conductive tabs 106 coupled to the cathode and the anode. The conductive tabs 106 may extend through seals in the enclosure (for example, formed using sealing tape 104) to provide terminals for the battery cell 100. The conductive tabs 106 may then be used to electrically couple the battery cell 100 with one or more other battery cells to form a battery pack.

Batteries can be combined in a battery pack in any configuration. For example, the battery pack may be formed by coupling the battery cells in a series, parallel, or a series-and-parallel configuration. Such coupled cells may be enclosed in a hard case to complete the battery pack, or may be embedded within an enclosure of a portable electronic device, such as a laptop computer, tablet computer, mobile phone, personal digital assistant (PDA), digital camera, and/or portable media player.

Figure 2A:
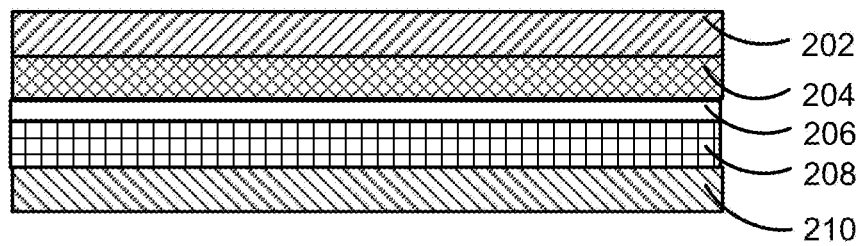
FIG. 2A presents a side view of a set of layers for a battery cell (e.g., the battery cell 100 of FIG. 1) in accordance with the disclosed embodiments.

FIG. 2A presents a side view of a set of layers for a battery cell (e.g., the battery cell 100 of FIG. 1) in accordance with the disclosed embodiments. The set of layers may include a cathode current collector 202, a cathode active material 204, a separator 206, an anode active material 208, and an anode current collector 210. The cathode current collector 202 and the cathode active material 204 may form a cathode for the battery cell, and the anode current collector 210 and the anode active material 208 may form an anode for the battery cell. To create the battery cell, the set of layers may be stacked in a planar configuration, or stacked and then wrapped into a wound configuration.

As mentioned above, the cathode current collector 202 may be aluminum foil, the cathode active material 204 may be a lithium compound, the anode current collector 210 may be copper foil, the anode active material 208 may be carbon, and the separator 206 may include a conducting polymer electrolyte.

The cathode active materials described herein can be used in conjunction with various battery stack form factors. For example, in addition to wound battery cells, the layers may be stacked and/or used to form other types of battery cell structures, such as bi-cell structures.

Figure 2B:
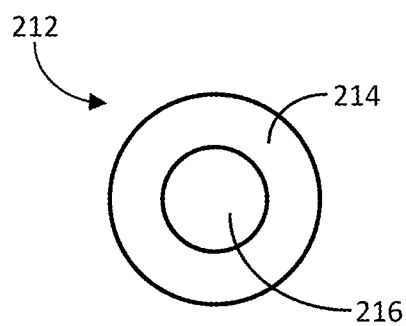
FIG. 2B is a sectional view of a coated particle including a cathode active particle and a coating in accordance with an illustrative embodiment.

In some embodiments, a cathode active material comprises a cathode active compound particle and a coating. FIG. 2B is a sectional view of a coated particle including a cathode active particle and a coating in accordance with an illustrative embodiment. As shown, a coated cathode active compound particle 212 can include a cathode active compound particle or a cathode active compound particle 216 and a coating 214.

The coating 214 can be an oxide material. In some embodiments, the coating may be a layer of material in contact with a surface of the cathode active compound particle or a reaction layer formed along the surface of the cathode active compound particle. In some embodiments, the coating can include an $Al_2O_3$ coated $Li(Co, Mn, M)O_2$ creating a doping-coating that has a pronounced concentration gradient of Al from the surface towards the bulk material.

In some embodiments, the coating may include other oxides, such as magnesium oxide (MgO), titanium oxide ($TiO_2$), and zirconium oxide ($ZrO_2$) among others.

In various embodiments, the performance of batteries including the cathode active material can increase battery capacity and/or reduce the loss of available power in a fully charged battery over time.

The coating can be in any amount known in the art. The coating may also be a continuous coating or a discontinuous coating. Non-limiting examples of discontinuous coatings include coatings with voids or cracks and coatings formed of particles with gaps there between. Other types of discontinuous coatings are possible.

A powder comprising the particles described herein can be used as a cathode active material in a lithium ion battery. Such cathode active materials can tolerate voltages equal to or higher than conventional materials (i.e., relative to a $Li/Li^+$ redox couple) without severe capacity fade. Capacity fade degrades battery performance and may result from a structural instability of the cathode active material, a side reaction with electrolyte at high voltage, surface instability, dissolution of cathode active material into the electrolyte, or some combination thereof. In various aspects, the cathode active materials described herein can result in lithium ion batteries that can be charged at high voltages without severe capacity fade. Without wishing to be held to a specific mechanisms or mode of action, the compounds may impede or retard structural deviations from an $\alpha$-$NaFeO_2$ crystal structure during charging to/at higher voltages.

Batteries having cathode active materials that include the disclosed coatings can show improved battery performance. For example, the annealed oxide coated particles provide for an increased battery capacity and an increase average voltage and also an increased discharge energy over cycles.

Cathode Active Compounds

Lithium cobalt manganese nickel aluminum oxides can be used in cathode active materials for commercial lithium-ion batteries. The performance of such cathode active materials can be increased by improving its capacity, working voltage, and gravimetric electrode density.

In some embodiments, cathode active compounds are represented by a compound of Formula (I):

$$Li_\alpha Co_{1-x-y-z}Me_w Mn_x Ni_y Al_z O_\delta \quad (I)$$

wherein $0.95 \leq \alpha \leq 1.05$, $0 < x \leq 0.050$, $0 < y \leq 0.040$, $0 < z \leq 0.070$, $0 \leq w \leq 0.020$, and $1.90 \leq \delta \leq 2.10$, wherein Me is selected from Zr, Mg, Ti, and combination thereof. In the formula, a, x, y, z, w, and δ for Li, Mn, Ni, Al, Me, and O, respectively, are in mole. In some variations, z can include the Al from the bulk or core and/or $Al_2O_3$ coating.

In some variations, α is greater than or equal to 0.95. In some variations, α is greater than or equal to 0.96. In some variations, α is greater than or equal to 0.97. In some variations, a is greater than or equal to 0.98. In some variations, α is greater than or equal to 0.99. In some variations, α is greater than or equal to 1.00. In some variations, α is greater than or equal to 1.01. In some variations, α is greater than or equal to 1.02. In some variations, α is greater than or equal to 1.03. In some variations, α is greater than or equal to 1.04.

In some variations, α is less than 1.05. In some variations, α is less than 1.04. In some variations, α is less than 1.03. In some variations, α is less than 1.02. In some variations, α is less than 1.01. In some variations, α is less than 1.00. In some variations, α is less than or equal to 0.99. In some variations, α is less than or equal to 0.98. In some variations, α is less than or equal to 0.97. In some variations, α is less than or equal to 0.96. It will be understood that α can be any of the variations above, in combination with other variations, and in any combination with any other quantities of any other element in the formulae disclosed herein.

In some variations, $0.95 \leq \alpha \leq 1.05$. In some variations, $0.96 \leq \alpha \leq 1.0$. In some variations, $0.97 \leq \alpha \leq 1.00$. In some variations, $0.98 \leq \alpha \leq 1.00$. In some variations, $0.98 \leq \alpha \leq 0.99$. In some variations, $0.97 \leq \alpha \leq 0.99$. In some variations, $1.00 \leq \alpha \leq 1.05$. In some variations, $1.00 \leq \alpha \leq 1.03$. In some variations, $1.00 \leq \alpha \leq 1.01$.

In some variations, $0 < x \leq 0.050$. In some variations, x is greater than 0. In some variations, x is greater than or equal to 0.005. In some variations, x is greater than or equal to 0.010. In some variations, x is greater than or equal to 0.015. In some variations, x is greater than or equal to 0.020. In some variations, x is greater than or equal to 0.025. In some variations, x is greater than or equal to 0.030. In some variations, x is greater than or equal to 0.035. In some variations, x is greater than or equal to 0.040. In some variations, x is greater than or equal to 0.045. In some variations, x is less than or equal to 0.050. In some variations, x is less than or equal to 0.045. In some variations, x is less than or equal to 0.040. In some variations, x is less than or equal to 0.035. In some variations, x is less than or equal to 0.030. In some variations, x is less than or equal to 0.025. In some variations, x is less than or equal to 0.020. In some variations, x is less than or equal to 0.015. In some variations, x is less than or equal to 0.010. In some variations, x is less than or equal to 0.005. It will be understood that x can be any of the variations above, in combination with other variations, and in any combination with any other quantities of any other element in the formulae disclosed herein.

In some variations, $0 < x \leq 0.050$. In some variations, $0.005 \leq x \leq 0.050$. In some variations, $0.010 \leq x \leq 0.050$. In some variations, $0.015 \leq x \leq 0.050$. In some variations, $0.020 \leq x \leq 0.050$. In some variations, $0.025 \leq x \leq 0.050$. In some variations, $0.030 \leq x \leq 0.050$. In some variations, $0.035 \leq x \leq 0.050$. In some variations, $0.040 \leq x \leq 0.050$. In some variations, $0.045 \leq x \leq 0.050$. In some variations, $0 < x \leq 0.045$. In some variations, $0.005 \leq x \leq 0.045$. In some variations, $0.010 \leq x \leq 0.045$. In some variations, $0.015 \leq x \leq 0.045$. In some variations, $0.020 \leq x \leq 0.045$. In some variations, $0.025 \leq x \leq 0.045$. In some variations, $0.030 \leq x \leq 0.045$. In some variations, $0.035 \leq x \leq 0.045$. In some variations, $0.040 \leq x \leq 0.045$. In some variations, $0 < x \leq 0.040$. In some variations, $0.005 \leq x \leq 0.040$. In some variations, $0.010 \leq x \leq 0.040$. In some variations, $0.015 \leq x \leq 0.040$. In some variations, $0.020 \leq x \leq 0.040$. In some variations, $0.025 \leq x \leq 0.040$. In some variations, $0.030 \leq x \leq 0.040$. In some variations, 0.035≤x≤0.040. In some variations, 0<x≤0.035. In some variations, 0.005≤x≤0.035. In some variations, 0.010≤x≤0.035. In some variations, 0.015≤x≤0.035. In some variations, 0.020≤x≤0.035. In some variations, 0.025≤x≤0.035. In some variations, 0.030≤x≤0.035. In some variations, 0<x≤0.030. In some variations, 0.005≤x≤0.030. In some variations, 0.010≤x≤0.030. In some variations, 0.015≤x≤0.030. In some variations, 0.020≤x≤0.030. In some variations, 0.025≤x≤0.030. In some variations, 0<x≤0.025. In some variations, 0.005≤x≤0.025. In some variations, 0.010≤x≤0.025. In some variations, 0.015≤x≤0.025. In some variations, 0.020≤x≤0.025. In some variations, 0<x≤0.020. In some variations, 0.005≤x≤0.020. In some variations, 0.010≤x≤0.020. In some variations, 0.015≤x≤0.020. In some variations, 0<x≤0.015. In some variations, 0.005≤x≤0.015. In some variations, 0.010≤x≤0.015. In some variations, 0<x≤0.010. In some variations, 0.005≤x≤0.010.

In some variations, 0<y≤0.040. In some variations, y is greater than 0. In some variations, y is greater than or equal to 0.005. In some variations, y is greater than or equal to 0.010. In some variations, y is greater than or equal to 0.015. In some variations, y is greater than or equal to 0.020. In some variations, y is greater than or equal to 0.025. In some variations, y is less than or equal to 0.030. In some variations, y is greater than or equal to 0.035. In some variations, y is less than or equal to 0.040. In some variations, y is less than or equal to 0.035. In some variations, y is less than or equal to 0.030. In some variations, y is less than or equal to 0.025. In some variations, y is less than or equal to 0.020. In some variations, y is less than or equal to 0.015. In some variations, y is less than or equal to 0.010. In some variations, y is less than or equal to 0.005. It will be understood that y can be any of the variations above, in combination with other variations, and in any combination with any other quantities of any other element in the formulae disclosed herein.

In some variations, 0<y≤0.040. In some variations, 0<y≤0.025. In some variations, 0.005≤y≤0.040. In some variations, 0.010≤y≤0.040. In some variations, 0.015≤y≤0.040. In some variations, 0.015≤y≤0.025. In some variations, 0.020≤y≤0.040. In some variations, 0.025≤y≤0.040. In some variations, 0.030≤y≤0.040. In some variations, 0.035≤y≤0.040. In some variations, 0<y≤0.035. In some variations, 0.005≤y≤0.035. In some variations, 0.010≤y≤0.035. In some variations, 0.015≤y≤0.035. In some variations, 0.020≤y≤0.035. In some variations, 0.025≤y≤0.035. In some variations, 0.030≤y≤0.035. In some variations, 0<y≤0.030. In some variations, 0.005≤y≤0.030. In some variations, 0.010≤y≤0.030. In some variations, 0.015≤y≤0.030. In some variations, 0.020≤y≤0.030. In some variations, 0.025≤y≤0.030. In some variations, 0<y≤0.025. In some variations, 0.005≤y≤0.025. In some variations, 0.010≤y≤0.025. In some variations, 0.015≤y≤0.025. In some variations, 0.020≤y≤0.025. In some variations, 0<y≤0.020. In some variations, 0.005≤y≤0.020. In some variations, 0.010≤y≤0.020. In some variations, 0.015≤y≤0.020. In some variations, 0<y≤0.015. In some variations, 0.005≤y≤0.015. In some variations, 0.010≤y≤0.015. In some variations, 0<y≤0.010. In some variations, 0.005≤y≤0.010.

In some variations, 0<z≤0.070. In some variations, z is greater than 0. In some variations, z is greater than or equal to 0.005. In some variations, z is greater than or equal to 0.010. In some variations, z is greater than or equal to 0.015. In some variations, z is less than or equal to 0.020. In some variations, z is less than or equal to 0.030. In some variations, z is less than or equal to 0.040. In some variations, z is less than or equal to 0.050. In some variations, z is less than or equal to 0.060. In some variations, z is less than or equal to 0.070. In some variations, z is less than or equal to 0.065. In some variations, z is less than or equal to 0.055. In some variations, z is less than or equal to 0.045. In some variations, z is less than or equal to 0.035. In some variations, z is less than or equal to 0.025. In some variations, z is less than or equal to 0.015. In some variations, z is less than or equal to 0.010. In some variations, z is less than or equal to 0.005. It will be understood that z can be any of the variations above, in combination with other variations, and in any combination with any other quantities of any other element in the formulae disclosed herein.

In some variations, 0<z≤0.070. In some variations, 0<z≤0.065. In some variations, 0≤z≤0.055. In some variations, 0<z≤0.045. In some variations, 0<z≤0.035. In some variations, 0<z≤0.025. In some variations, 0<z≤0.015. In some variations, 0<z≤0.010. In some variations, 0.005≤z≤0.070. In some variations, 0.010≤z≤0.070. In some variations, 0.015≤z≤0.070. In some variations, 0.020≤z≤0.070. In some variations, 0.025≤z≤0.070. In some variations, 0.030≤z≤0.070. In some variations, 0.035≤z≤0.070. In some variations, 0.040≤z≤0.070. In some variations, 0.045≤z≤0.070. In some variations, 0.050≤z≤0.070. In some variations, 0.055≤z≤0.070. In some variations, 0.005≤z≤0.065. In some variations, 0.010≤z≤0.065. In some variations, 0.015≤z≤0.065. In some variations, 0.020≤z≤0.065. In some variations, 0.025≤z≤0.065. In some variations, 0.030≤z≤0.065. In some variations, 0.035≤z≤0.065. In some variations, 0.040≤z≤0.065. In some variations, 0.045≤z≤0.065. In some variations, 0.050≤z≤0.065. In some variations, 0.005≤z≤0.060. In some variations, 0.010≤z≤0.060. In some variations, 0.015≤z≤0.060. In some variations, 0.020≤z≤0.060. In some variations, 0.025≤z≤0.060. In some variations, 0.030≤z≤0.060. In some variations, 0.035≤z≤0.060. In some variations, 0.040≤z≤0.060. In some variations, 0.045≤z≤0.060. In some variations, 0.050≤z≤0.060. In some variations, 0.055≤z≤0.060. In some variations, 0.005≤z≤0.055. In some variations, 0.010≤z≤0.055. In some variations, 0.015≤z≤0.055. In some variations, 0.020≤z≤0.055. In some variations, 0.025≤z≤0.055. In some variations, 0.030≤z≤0.055. In some variations, 0.035≤z≤0.055. In some variations, 0.040≤z≤0.055. In some variations, 0.045≤z≤0.055. In some variations, 0.050≤z≤0.055. In some variations, 0.005≤z≤0.050. In some variations, 0.010≤z≤0.050. In some variations, 0.015≤z≤0.050. In some variations, 0.020≤z≤0.050. In some variations, 0.025≤z≤0.050. In some variations, 0.030≤z≤0.050. In some variations, 0.035≤z≤0.050. In some variations, 0.040≤z≤0.050. In some variations, 0.045≤z≤0.050. In some variations, 0.005≤z≤0.045. In some variations, 0.010≤z≤0.045. In some variations, 0.015≤z≤0.045. In some variations, 0.020≤z≤0.045. In some variations, 0.025≤z≤0.045. In some variations, 0.030≤z≤0.045. In some variations, 0.035≤z≤0.045. In some variations, 0.040≤z≤0.045. In some variations, 0<z≤0.040. In some variations, 0.005≤z≤0.040. In some variations, 0.010≤z≤0.040. In some variations, 0.015≤z≤0.040. In some variations, 0.020≤z≤0.040. In some variations, 0.025≤z≤0.040. In some variations, 0.030≤z≤0.040. In some variations, 0.035≤z≤0.040. In some variations, 0.005≤z≤0.035. In some variations, 0.010≤z≤0.035. In some variations, 0.015≤z≤0.035. In some variations, 0.020≤z≤0.035. In some variations, 0.025≤z≤0.035. In some variations, 0.030≤z≤0.035. In some variations, 0<z≤0.030. In some variations, 0.005≤z≤0.030. In some variations, 0.010≤z≤0.030. In some variations, $0.015 \leq z \leq 0.030$. In some variations, $0.020 \leq z \leq 0.030$. In some variations, $0.025 \leq z \leq 0.030$. In some variations, $0.005 \leq z \leq 0.025$. In some variations, $0.010 \leq z \leq 0.025$. In some variations, $0.015 \leq z \leq 0.025$. In some variations, $0.020 \leq z \leq 0.025$. In some variations, $0 < z \leq 0.020$. In some variations, $0.005 \leq z \leq 0.020$. In some variations, $0.010 \leq z \leq 0.020$. In some variations, $0.015 \leq z \leq 0.020$. In some variations, $0.005 \leq z \leq 0.015$. In some variations, $0.010 \leq z \leq 0.015$. In some variations, $0 < z \leq 0.010$. In some variations, $0.005 \leq z \leq 0.010$.

In some variations, $0 < w \leq 0.020$. In some variations, w is greater than 0. In some variations, w is greater than or equal to 0.005. In some variations, w is greater than or equal to 0.010. In some variations, w is greater than or equal to 0.015. In some variations, w is less than or equal to 0.020. In some variations, w is less than or equal to 0.015. In some variations, w is less than or equal to 0.010. In some variations, w is less than or equal to 0.005. It will be understood that w can be any of the variations above, in combination with other variations, and in any combination with any other quantities of any other element in the formulae disclosed herein.

In some variations, $0 < w \leq 0.020$. In some variations, $0 < w \leq 0.015$. In some variations, $0.005 \leq w \leq 0.020$. In some variations, $0.010 \leq w \leq 0.020$. In some variations, $0.015 \leq w \leq 0.020$. In some variations, $0.015 \leq w \leq 0.020$. In some variations, $0.005 \leq w \leq 0.015$. In some variations, $0.010 \leq w \leq 0.015$. In some variations, $0 < w \leq 0.010$. In some variations, $0.005 \leq w \leq 0.010$.

In some variations, $1.90 \leq \delta \leq 2.10$. In some variations, $\delta$ is greater than or equal to 1.90. In some variations, $\delta$ is greater than or equal to 1.92. In some variations, $\delta$ is greater than or equal to 1.94. In some variations, $\delta$ is greater than or equal to 1.96. In some variations, $\delta$ is greater than or equal to 1.98. In some variations, $\delta$ is greater than or equal to 2.00. In some variations, $\delta$ is greater than or equal to 2.02. In some variations, $\delta$ is greater than or equal to 2.04. In some variations, $\delta$ is greater than or equal to 2.06. In some variations, $\delta$ is greater than or equal to 2.08. In some variations, $\delta$ is less than or equal to 2.10. In some variations, $\delta$ is less than or equal to 2.08. In some variations, $\delta$ is less than or equal to 2.06. In some variations, $\delta$ is less than or equal to 2.04. In some variations, $\delta$ is less than or equal to 2.02. In some variations, $\delta$ is less than or equal to 2.00. In some variations, $\delta$ is less than or equal to 1.98. In some variations, $\delta$ is less than or equal to 1.96. In some variations, $\delta$ is less than or equal to 1.94. In some variations, $\delta$ is less than or equal to 1.92. It will be understood that $\delta$ can be any of the variations above, in combination with other variations, and in any combination with any other quantities of any other element in the formulae disclosed herein.

In some variations, $1.92 \leq \delta \leq 2.08$. In some variations, $1.94 \leq \delta \leq 2.06$. In some variations, $1.96 \leq \delta \leq 2.04$. In some variations, $1.98 \leq \delta \leq 2.02$.

Particles

The compounds can be in the form of particles.

In some embodiments, a particle comprising a core comprising a compound of formula II as follows:

$$Li_\alpha Co_{1-s-t-u-v}Me_sMn_tNi_uAl_vO_\delta \quad (II)$$

wherein Me is selected from Al, Zr, Mg, and Ti, wherein $0.95 \leq \alpha \leq 1.05$, $0 < t \leq 0.050$, $0 < u \leq 0.040$, $0 < v \leq 0.050$, $0 \leq s \leq 0.020$, and $1.90 \leq \delta \leq 2.10$. The particle also includes a coating comprising an oxide selected from $Al_2O_3$, $ZrO_2$, MgO, $TiO_2$, and a combination thereof.

In some variations, $\alpha$ is greater than or equal to 0.95. In some variations, $\alpha$ is greater than or equal to 0.96. In some variations, $\alpha$ is greater than or equal to 0.97. In some variations, a is greater than or equal to 0.98. In some variations, $\alpha$ is greater than or equal to 0.99. In some variations, $\alpha$ is greater than or equal to 1.00. In some variations, $\alpha$ is greater than or equal to 1.01. In some variations, $\alpha$ is greater than or equal to 1.02. In some variations, $\alpha$ is greater than or equal to 1.03. In some variations, $\alpha$ is greater than or equal to 1.04.

In some variations, $\alpha$ is less than 1.05. In some variations, $\alpha$ is less than 1.04. In some variations, $\alpha$ is less than 1.03. In some variations, $\alpha$ is less than 1.02. In some variations, $\alpha$ is less than 1.01. In some variations, $\alpha$ is less than 1.00. In some variations, $\alpha$ is less than or equal to 0.99. In some variations, $\alpha$ is less than or equal to 0.98. In some variations, $\alpha$ is less than or equal to 0.97. In some variations, $\alpha$ is less than or equal to 0.96. It will be understood that $\alpha$ can be any of the variations above, in combination with other variations, and in any combination with any other quantities of any other element in the formulae disclosed herein.

In some variations, $0.95 \leq \alpha \leq 1.05$. In some variations, $0.96 \leq \alpha \leq 1.0$. In some variations, $0.97 \leq \alpha \leq 1.00$. In some variations, $0.98 \leq \alpha \leq 1.00$. In some variations, $0.98 \leq \alpha \leq 0.99$. In some variations, $0.97 \leq \alpha \leq 0.99$. In some variations, $1.00 \leq \alpha \leq 1.05$. In some variations, $1.00 \leq \alpha \leq 1.03$. In some variations, $1.00 \leq \alpha \leq 1.01$.

In some variations, $0 < t \leq 0.050$. In some variations, t is greater than 0. In some variations, t is greater than or equal to 0.005. In some variations, t is greater than or equal to 0.010. In some variations, t is greater than or equal to 0.015. In some variations, t is greater than or equal to 0.020. In some variations, t is greater than or equal to 0.025. In some variations, t is greater than or equal to 0.030. In some variations, t is greater than or equal to 0.035. In some variations, t is less than or equal to 0.040. In some variations, t is greater than or equal to 0.045. In some variations, t is less than or equal to 0.050. In some variations, t is less than or equal to 0.045. In some variations, t is less than or equal to 0.040. In some variations, t is less than or equal to 0.035. In some variations, t is less than or equal to 0.030. In some variations, t is less than or equal to 0.025. In some variations, t is less than or equal to 0.020. In some variations, t is less than or equal to 0.015. In some variations, t is less than or equal to 0.010. In some variations, t is less than or equal to 0.005. It will be understood that t can be any of the variations above, in combination with other variations, and in any combination with any other quantities of any other element in the formulae disclosed herein.

In some variations, $0 < t \leq 0.050$. In some variations, $0.005 \leq t \leq 0.050$. In some variations, $0.010 \leq t \leq 0.050$. In some variations, $0.015 \leq t \leq 0.050$. In some variations, $0.020 \leq t \leq 0.050$. In some variations, $0.025 \leq t \leq 0.050$. In some variations, $0.025 \leq t \leq 0.035$. In some variations, $0.035 \leq t \leq 0.050$. In some variations, $0.040 \leq t \leq 0.050$. In some variations, $0.045 \leq t \leq 0.050$. In some variations, $0 < t \leq 0.045$. In some variations, $0.005 \leq t \leq 0.045$. In some variations, $0.010 \leq t \leq 0.045$. In some variations, $0.015 \leq t \leq 0.045$. In some variations, $0.020 \leq t \leq 0.045$. In some variations, $0.025 \leq t \leq 0.045$. In some variations, $0.030 \leq t \leq 0.045$. In some variations, $0.035 \leq t \leq 0.045$. In some variations, $0.040 \leq t \leq 0.045$. In some variations, $0 < t \leq 0.040$. In some variations, $0.005 \leq t \leq 0.040$. In some variations, $0.010 \leq t \leq 0.040$. In some variations, $0.015 \leq t \leq 0.040$. In some variations, $0.020 \leq t \leq 0.040$. In some variations, $0.025 \leq t \leq 0.040$. In some variations, $0.030 \leq t \leq 0.040$. In some variations, $0.035 \leq t \leq 0.040$. In some variations, $0 < t \leq 0.035$. In some variations, $0.005 \leq t \leq 0.035$. In some variations, $0.010 \leq t \leq 0.035$. In some variations, $0.015 \leq t \leq 0.035$. In some variations, 0.020≤t≤0.035. In some variations, 0.025≤t≤0.035. In some variations, 0.030≤t≤0.035. In some variations, 0<t≤0.030. In some variations, 0.005≤t≤0.030. In some variations, 0.010≤t≤0.030. In some variations, 0.015≤t≤0.030. In some variations, 0.020≤t≤0.030. In some variations, 0.025≤t≤0.030. In some variations, 0<t≤0.025. In some variations, 0.005≤t≤0.025. In some variations, 0.010≤t≤0.025. In some variations, 0.015≤t≤0.025. In some variations, 0.020≤t≤0.025. In some variations, 0<t≤0.020. In some variations, 0.005≤t≤0.020. In some variations, 0.010≤t≤0.020. In some variations, 0.015≤t≤0.020. In some variations, 0<t≤0.015. In some variations, 0.005≤t≤0.015. In some variations, 0.010≤t≤0.015. In some variations, 0<t≤0.010. In some variations, 0.005≤t≤0.010.

In some variations, 0<u≤0.040. In some variations, u is greater than 0. In some variations, u is greater than or equal to 0.005. In some variations, u is greater than or equal to 0.010. In some variations, u is greater than or equal to 0.015. In some variations, u is greater than or equal to 0.020. In some variations, u is greater than or equal to 0.025. In some variations, u is less than or equal to 0.030. In some variations, u is greater than or equal to 0.035. In some variations, u is less than or equal to 0.040. In some variations, u is less than or equal to 0.035. In some variations, u is less than or equal to 0.030. In some variations, u is less than or equal to 0.025. In some variations, u is less than or equal to 0.020. In some variations, u is less than or equal to 0.015. In some variations, u is less than or equal to 0.010. In some variations, u is less than or equal to 0.005. It will be understood that u can be any of the variations above, in combination with other variations, and in any combination with any other quantities of any other element in the formulae disclosed herein.

In some variations, 0<u≤0.040. In some variations, 0<u≤0.025. In some variations, 0.005≤u≤0.040. In some variations, 0.010≤u≤0.040. In some variations, 0.015≤u≤0.040. In some variations, 0.015≤u≤0.025. In some variations, 0.020≤u≤0.040. In some variations, 0.025≤u≤0.040. In some variations, 0.030≤u≤0.040. In some variations, 0.035≤u≤0.040. In some variations, 0<u≤0.035. In some variations, 0.005≤u≤0.035. In some variations, 0.010≤u≤0.035. In some variations, 0.015≤u≤0.035. In some variations, 0.020≤u≤0.035. In some variations, 0.025≤u≤0.035. In some variations, 0.030≤u≤0.035. In some variations, 0<u≤0.030. In some variations, 0.005≤u≤0.030. In some variations, 0.010≤u≤0.030. In some variations, 0.015≤u≤0.030. In some variations, 0.020≤u≤0.030. In some variations, 0.025≤u≤0.030. In some variations, 0<u≤0.025. In some variations, 0.005≤u≤0.025. In some variations, 0.010≤u≤0.025. In some variations, 0.015≤u≤0.025. In some variations, 0.020≤u≤0.025. In some variations, 0<u≤0.020. In some variations, 0.005≤u≤0.020. In some variations, 0.010≤u≤0.020. In some variations, 0.015≤u≤0.020. In some variations, 0≤u≤0.015. In some variations, 0.005≤u≤0.015. In some variations, 0.010≤u≤0.015. In some variations, 0<u≤0.010. In some variations, 0.005≤u≤0.010.

In some variations, 0<v≤0.050. In some variations, v is greater than 0. In some variations, v is greater than or equal to 0.005. In some variations, v is greater than or equal to 0.010. In some variations, v is greater than or equal to 0.015. In some variations, v is less than or equal to 0.020. In some variations, v is less than or equal to 0.030. In some variations, v is less than or equal to 0.040. In some variations, v is less than or equal to 0.050. In some variations, v is less than or equal to 0.045. In some variations, v is less than or equal to 0.035. In some variations, v is less than or equal to 0.025. In some variations, v is less than or equal to 0.015. In some variations, v is less than or equal to 0.010. In some variations, v is less than or equal to 0.005. It will be understood that v can be any of the variations above, in combination with other variations, and in any combination with any other quantities of any other element in the formulae disclosed herein.

In some variations, 0<v≤0.050. In some variations, 0<v≤0.045. In some variations, 0<v≤0.035. In some variations, 0<v≤0.025. In some variations, 0<v≤0.015. In some variations, 0<v≤0.010. In some variations, 0.005≤v≤0.050. In some variations, 0.010≤v≤0.050. In some variations, 0.015≤v≤0.050. In some variations, 0.020≤v≤0.050. In some variations, 0.025≤v≤0.050. In some variations, 0.030≤v≤0.050. In some variations, 0.035≤v≤0.050. In some variations, 0.040≤v≤0.050. In some variations, 0.045≤v≤0.050. In some variations, 0<v≤0.045. In some variations, 0.005≤v≤0.045. In some variations, 0.010≤v≤0.045. In some variations, 0.015≤v≤0.045. In some variations, 0.020≤v≤0.045. In some variations, 0.025≤v≤0.045. In some variations, 0.030≤v≤0.045. In some variations, 0.035≤v≤0.045. In some variations, 0.040≤v≤0.045. In some variations, 0<v≤0.040. In some variations, 0.005≤v≤0.040. In some variations, 0.010≤v≤0.040. In some variations, 0.015≤v≤0.040. In some variations, 0.020≤v≤0.040. In some variations, 0.025≤v≤0.040. In some variations, 0.030≤v≤0.040. In some variations, 0.035≤v≤0.040. In some variations, 0<v≤0.035. In some variations, 0.005≤v≤0.035. In some variations, 0.010≤v≤0.035. In some variations, 0.015≤v≤0.035. In some variations, 0.020≤v≤0.035. In some variations, 0.025≤v≤0.035. In some variations, 0.030≤v≤0.035. In some variations, 0<v≤0.030. In some variations, 0.005≤v≤0.030. In some variations, 0.010≤v≤0.030. In some variations, 0.015≤v≤0.030. In some variations, 0.020≤v≤0.030. In some variations, 0.025≤v≤0.030. In some variations, 0<v≤0.025. In some variations, 0.005≤v≤0.025. In some variations, 0.010≤v≤0.025. In some variations, 0.015≤v≤0.025. In some variations, 0.020≤v≤0.025. In some variations, 0<v≤0.020. In some variations, 0.005≤v≤0.020. In some variations, 0.010≤v≤0.020. In some variations, 0.015≤v≤0.020. In some variations, 0<v≤0.015. In some variations, 0.005≤v≤0.015. In some variations, 0.010≤v≤0.015. In some variations, 0<v≤0.010. In some variations, 0.005≤v≤0.010.

In some variations, 0<s≤0.020. In some variations, s is greater than 0. In some variations, s is greater than or equal to 0.005. In some variations, s is greater than or equal to 0.010. In some variations, s is greater than or equal to 0.015. In some variations, s is less than or equal to 0.020. In some variations, s is less than or equal to 0.015. In some variations, s is less than or equal to 0.010. In some variations, s is less than or equal to 0.005. It will be understood that s can be any of the variations above, in combination with other variations, and in any combination with any other quantities of any other element in the formulae disclosed herein.

In some variations, 0<s≤0.020. In some variations, 0<s≤0.015. In some variations, 0.005≤s≤0.020. In some variations, 0.010≤s≤0.020. In some variations, 0.015≤s≤0.020. In some variations, 0.015≤s≤0.020. In some variations, 0.005≤s≤0.015. In some variations, 0.010≤s≤0.015. In some variations, 0<s≤0.010. In some variations, 0.005≤s≤0.010.

In some variations, 1.90≤δ≤2.10. In some variations, δ is greater than or equal to 1.90. In some variations, δ is greater than or equal to 1.92. In some variations, δ is greater than or equal to 1.94. In some variations, δ is greater than or equal to 1.96. In some variations, δ is greater than or equal to 1.98. In some variations, δ is greater than or equal to 2.00. In some variations, δ is greater than or equal to 2.02. In some variations, δ is greater than or equal to 2.04. In some variations, δ is greater than or equal to 2.06. In some variations, δ is greater than or equal to 2.08. In some variations, δ is less than or equal to 2.10. In some variations, δ is less than or equal to 2.08. In some variations, δ is less than or equal to 2.06. In some variations, δ is less than or equal to 2.04. In some variations, δ is less than or equal to 2.02. In some variations, δ is less than or equal to 2.00. In some variations, δ is less than or equal to 1.98. In some variations, δ is less than or equal to 1.96. In some variations, δ is less than or equal to 1.94. In some variations, δ is less than or equal to 1.92. It will be understood that δ can be any of the variations above, in combination with other variations, and in any combination with any other quantities of any other element in the formulae disclosed herein.

In some variations, 1.92≤δ≤2.08. In some variations, 1.94≤δ≤2.06. In some variations, 1.96≤δ≤2.04. In some variations, 1.98≤δ≤2.02.

The morphology of particles can also influence the performance of cathode active materials. Particles can include primary and secondary particles. Primary particle and secondary particle size distribution, shape, and porosity can impact the density of lithium cobalt oxide electrodes. Secondary particles are comprised of agglomerates of the smaller, primary particles, which are also often referred to as grains. Control of the secondary particle characteristics of shape and density can be gained.

In some variations, the primary particles have a mean particle diameter greater than or equal to a second lower limit. In some variations, the primary particle has a mean diameter of at least 200 nm. In some variations, the primary particle has a mean diameter of at least 300 nm. In some variations, the primary particle has a mean diameter of at least 400 nm. In some variations, the primary particle has a mean diameter of at least 500 nm. In some variations, the primary particle has a mean diameter of at least 600 nm. In some variations, the particle has a mean diameter of at least 700 nm.

In some variations, the primary particles have a mean particle diameter less than or equal to a second upper limit. In some variations, the primary particle has a mean diameter of less than or equal to 800 nm. In some variations, the primary particle has a mean diameter of less than or equal to 700 nm. In some variations, the primary particle has a mean diameter of less than or equal to 600 nm. In some variations, the primary particle has a mean diameter of less than or equal to 500 nm. In some variations, the primary particle has a mean diameter of less than or equal to 400 nm. In some variations, the primary particle has a mean diameter of less than or equal to 300 nm.

It will be understood that the second lower and upper limits may be combined in any variation as above to define a second range for the mean particle diameter of the primary particle. For example, and without limitation, the mean particle diameter may range from 300 nm to 500 nm. In another non-limiting example, the mean particle diameter may range from 400 nm to 800 nm. Other ranges are possible. The particles having the aforementioned mean particle diameters, whether characterized by the second lower limit, the second upper limit, or both (i.e., the second range), may be processed according to a sol-gel method.

In some variations, the secondary particles are formed of agglomerated primary particles. The agglomerated primary particles may be sintered together. In some instances, the secondary particles have a mean particle diameter greater than or equal to a lower limit. Non-limiting examples of the lower limit of the secondary particles include 15 μm, 20 μm, and 25 μm. In some instances, the secondary particles have a mean particle diameter less than or equal to an upper limit. Non-limiting examples of the upper limit include 30 μm, 25 μm, and 20 μm. It will be understood that the lower and upper limits may be combined in any variation as above to define a range for the mean particle diameter. For example, and without limitation, the mean particle diameter may range from 15 μm to 20 μm. In another non-limiting example, the mean particle diameter may range from 20 μm to 25 μm. Other ranges are possible.

In some variations, the secondary particle has a mean particle diameter greater than or equal to a first lower limit. In some variations, the secondary particle has a mean diameter of at least 5 μm. In some variations, the secondary particle has a mean diameter of at least 10 μm. In some variations, the secondary particle has a mean diameter of at least 15 μm. In some variations, the secondary particle has a mean diameter of at least 20 μm. In some variations, the secondary particle has a mean diameter of at least 25 μm.

In some variations, the secondary particle has a mean particle diameter less than or equal to a first upper limit. In some variations, the secondary particle has a mean diameter of less than or equal to 30 μm. In some variations, the secondary particle has a mean diameter of less than or equal to 25 μm. In some variations, the secondary particle has a mean diameter of less than or equal to 20 μm. In some variations, the secondary particle has a mean diameter of less than or equal to 15 μm. In some variations, the secondary particle has a mean diameter of less than or equal to 10 μm. In some variations, the secondary particle has a mean diameter of less than or equal to 5 μm.

It will be understood that the first lower and upper limits may be combined in any variation as above to define a first range for the mean particle diameter. For example, and without limitation, the mean secondary particle diameter may range from 10 μm to 20 μm. In another non-limiting example, the mean particle diameter may range from 20 μm to 25 μm. Other ranges are possible. The particles having the aforementioned mean particle diameters, whether characterized by the first lower limit, the first upper limit, or both (i.e., the first range), may be processed according to a co-precipitation method.

In some variations, a single primary particle occupies a percentage of a volume occupied by a corresponding secondary particle. In some instances, the percentage is greater or equal to a lower limit. In some variations, a single primary particle occupies at least 30% of a volume occupied by a corresponding secondary particle. In some variations, a single primary particle occupies at least 35% of a volume occupied by a corresponding secondary particle. In some variations, a single primary particle occupies at least 40% of a volume occupied by a corresponding secondary particle. In some variations, a single primary particle occupies at least 45% of a volume occupied by a corresponding secondary particle. In some variations, a single primary particle occupies at least 50% of a volume occupied by a corresponding secondary particle. In some variations, a single primary particle occupies at least 55% of a volume occupied by a corresponding secondary particle. In some variations, a single primary particle occupies at least 60 of a volume occupied by a corresponding secondary particle. In some variations, a single primary particle occupies at least 65% of a volume occupied by a corresponding secondary particle.

In some variations, a single primary particle occupies less than or equal to 70% of a volume occupied by a corresponding secondary particle. In some variations, a single primary particle occupies less than or equal to 65% of a volume occupied by a corresponding secondary particle. In some variations, a single primary particle occupies less than or equal to 60% of a volume occupied by a corresponding secondary particle. In some variations, a single primary particle occupies less than or equal to 55% of a volume occupied by a corresponding secondary particle. In some variations, a single primary particle occupies less than or equal to 50% of a volume occupied by a corresponding secondary particle. In some variations, a single primary particle occupies less than or equal to 45% of a volume occupied by a corresponding secondary particle. In some variations, a single primary particle occupies less than or equal to 40% of a volume occupied by a corresponding secondary particle. In some variations, a single primary particle occupies less than or equal to 35% of a volume occupied by a corresponding secondary particle.

It will be understood that the lower and upper limits may be combined in any variation as above to define a range for the percentage. For example, and without limitation, the percentage may range from 30-50%. However, other ranges are possible.

As described herein, the larger particle sizes, and percentage of secondary particles occupied by a singled primary particle, can be formed by using higher sintering temperatures. Without wishing to be held to a particular mechanism or mode of action, in some instances, the particles do not fracture as readily, and thereby can provide increased stability than conventional particles.

Aluminum Oxide Coatings on a Core

In some embodiments, particles comprising the cathode active material can form a core. The core can be composed of a lithium cobalt manganese nickel aluminum oxide composition, as discussed above. In some embodiments, the core can be coated with an aluminum oxide coating. The combination of core and coating materials can provide a surface-stable high energy cathode.

Including Mn and/or Al in the compound in place of Co, altering the amount of Li, and/or including an $Al_2O_3$ coating can reduce, or reduce the likelihood of, a destabilizing phase transition. Without wishing to be limited to a particular mechanism or mode of action, the additional elements can provide greater oxidative stability to the compounds at higher battery upper cut-off voltages. In some variations, the compounds, particles, and/or cathode active materials can have increased stability.

In some variations, the particles have increased particle strength. The increased particle strength results in increased energy retention when the particles are used in a cathode active material.

In some variations, increased amount of manganese in cathode active materials provides for improved battery stability. In some variations, the increased amount of Mn increases the onset temperature of decomposition. In some variations, increased amounts of Mn can result in reduced amount of heat release at a decomposition temperature of the compound.

Methods of Making the Cathode Active Material

The disclosure is further directed to methods of making the cathode active material. The aluminum oxide coating is prepared by mixing a cathode active compound particle with a precursor of the metals that are found in the coatings. After mixing, the mixture is calcined at elevated temperatures to decompose the precursors into oxides or to promote formation of the oxide on the cathode active compound material. The coated cathode active material is then tested as cathode in coin cells that use a Li foil anode, a separator, and flooded electrolyte solution or in single layered full pouch cells (SLP) that use a graphite as anode, a separator and electrolyte solution.

In some variations, to form $Al_2O_3$ coating, an amount of aluminum precursor needed for a desired amount of coating (e.g., 1500 ppm) was calculated based on the weighed amount of base powder. The aluminum precursor included various aluminum salts such as nano alumina, aluminum nitrate, aluminum acetate, or other aluminum salts.

Without wishing to be limited to any method of manufacture, the disclosure describes cathode active materials produced by high temperature (e.g., ranging from 700° C. to 1100° C.) treating an as-prepared material with an $Al_2O_3$ coating on a cathode active material. For example, annealing may be performed at 1000° C. for 8 hours. The stabilization of lithium cobalt oxides ($LiCoO_2$) can include elements that mitigate degradation mechanisms, yet allow for more lithium to be extracted and re-inserted reversibly at higher operating voltages and temperatures.

The presence of aluminum can improve one or more properties, including capacity, voltage, and/or cycle life of the active electrode material. Elements can be distributed throughout the bulk of the material, segregated to the grain boundaries within the particles, distributed in the subsurface of particles, or deposited on the particle free surface (coating) depending on phase relations and the processing procedure and conditions.

In some variations, the amount of Al may be less than or equal to 20,000 ppm. In some variations, the amount of Al may be less than or equal to 15,000 ppm. In some variations, the amount of Al may be less than or equal to 10,000 ppm. In some variations, the amount of Al may be less than or equal to 9,000 ppm. In some variations, the amount of Al may be less than or equal to 8,000 ppm. In some variations, the amount of Al may be less than or equal to 7,000 ppm. In some variations, the amount of Al may be less than or equal to 6,000 ppm. In some variations, the amount of Al may be less than or equal to 5,000 ppm. In some variations, the amount of Al may be less than or equal to 4,000 ppm. In some variations, the amount of Al may be less than or equal to 3,000 ppm. In some variations, the amount of Al may be less than or equal to 2,000 ppm. In some variations, the amount of Al may be less than or equal to 1,000 ppm. In some variations, the amount of Al may be less than or equal to 500 ppm. In some variations, the amount of Al may be less than or equal to 100 ppm.

The amount of Al of 3000 ppm is close to 1.1 mol % of Al.

Forming Cathodes

In some variations, the finished cathode powder is blended with an electrically conductive powder (carbon), organic binder, and solvent to form a pourable slurry. This slurry is cast on aluminum foil and dried, forming a laminate.

In some variations, the laminate is subsequently roll-calendared to compact the particulate layer to a high specific density. During calendaring, the particles flow into voids and pack together. The particles can have sufficient strength to prevent being crushed, which would create new active unprotected surfaces that will interact with the electrolyte during cell operation. The finished laminate is assembled together with a separator and anode layers and saturated with an electrolyte solution to form a Li-ion cell.

In some variations, the cathode disks can be formed from the coated powder. A mill may be used to grind powder into finer powder. The density of the cathode disk may increase by reducing the size of the powder.

In some variations, the porosity of the cathode may affect the performance of an electrochemical cell. A hydraulic press may be used to compact powder to obtain a cathode disk of desired thickness and density during cold pressing. For example, the coated cathode active material was placed in a die that can be compressed up to 5000 lbs. The press includes two plates that are hydraulically forced together to create a pressure.

Testing Methods

In some variations, cathode disks are assembled into button cell (coin cell) batteries with a Li disk anode, a Celgard 2325 separator (25 μm thick), and the electrolyte consisting of 1.2 M LiPF6 in ethyl carbonate (EC) and ethyl methyl carbonate (EMC) (EC:EMC=3:7 w/w). Galvanostatic charge/discharge cycling is conducted in the 3.0-4.5 V range at 25° C. The test procedure includes three formation cycles at a ~C/5 rate with the 1C capacity assumed to be 185 mAh/g, followed by aging cycles at a C/5 rate with the 1C capacity calculated based on the third cycle discharge capacity. The batteries are aged for 30 to 50 cycles.

An electrochemical tester (e.g., Maccor 4200) can provide a user with a variety of options in testing of batteries. Multiple channels can be plugged into the electrochemical tester to allow for multiple batteries to be tested simultaneously. These tests allow the user to measure parameters of the batteries, such as voltage, current, impedance, and capacity, to fully understand the effectiveness of the electrochemical cell being tested. The tester can be attached to a computer to obtain digital testing values.

EXAMPLES

The following examples are for illustration purposes only. It will be apparent to those skilled in the art that many modifications, both to materials and methods, may be practiced without departing from the scope of the disclosure.

Example 1

A manganese (Mn), nickel (Ni), and aluminum (Al) substituted $LiCoO_2$ cathode powder was synthesized using a coprecipitation process to produce a hydroxide precursor. The composition was determined by high precision inductively coupled plasma-optical emission spectrometry, ICP-OES). The hydroxide precursor was blended together and calcined with lithium carbonate ($Li_2CO_3$) at 1085° C. for 15 hours to form a cathode active material in a form of a powder. The cathode active material was then coated with nano-sized $Al_2O_3$ in an amount, for example, 1250 ppm by weight, and heat treated at elevated temperatures, such as 900° C.

A co-precipitation reaction was run. 2.5 liters of 1-molar aqueous ammonia solution were introduced into a 4-liter CSTR for a co-precipitation reaction with a rate of 20 ml/min of nitrogen gas protection and agitated at 1200 rpm while maintaining a reactor temperature of 55° C. A 1-molar metal aqueous solution in which manganese sulfate, cobalt sulfate and nickel sulfate were mixed at a target mole ratio and was continuously added into the reactor at 0.2 liters/hour, and a 5-molar ammonia hydroxide solution was also continuously added into the reactor at 0.05 liters/hour. In addition, the pH was fixed at 11.5 by adding a 2-molar aqueous solution of sodium hydroxide using a pH controller/pump. The average time of retaining the solution in the reactor was maintained at 6.57 hours by controlling the amount of flow into the reactor. The total run time was about 24 hours. The final precursor particles were washed, filtered and dried.

The initial composition of the aqueous solution in the reactor at the beginning of the coprecipitation process contained at least one or a mixture of the following solutions: distilled water, ammonia, sodium sulfate, and/or a mother liquid, which included a coprecipitation solution taken from a previous process batch.

An aqueous solution containing a manganese and/or cobalt sulfate was formed. For example, the aqueous solution was dripped into a CSTR by a feeding mechanism. In addition, a concentration of the nickel, manganese, and cobalt sulfates in the aqueous solution ranged from 0.5 mol/L to 5 mol/L.

Next, a $NH_4OH$ solution was added to the aqueous solution to form a particulate solution containing irregular secondary particles of the precursor co-precipitate material. The particulate solution was maintained at a constant temperature in the range of 30-65° C. and formed in an inert gas atmosphere containing nitrogen, argon, and/or another inert gas. A constant pH in the range of 10-12 was also maintained in the particulate solution by adding a basic solution to the particulate solution. The basic solution included an alkali metal hydroxide with a concentration in the range of 0.5 mol/L to 10 mol/L, an alkali carbonate, and/or an alkali oxalate.

The particulate solution was further agitated (e.g., in the CSTR) to form spherical co-precipitate particles from the irregular secondary particles. Such agitation was performed for 3-12 hours to form spherical co-precipitate particles with a median particle size of greater than 15 microns. After the spherical co-precipitate particles reached their desired size, the spherical co-precipitate particles were filtered from the particulate solution, washed, and dried.

The spherical co-precipitate particles were then used to form a cathode active material composition for use in a lithium-ion battery. For example, spherical precursor particles formed using the solution co-precipitation reaction described above may have a composition represented by $Mn_xNi_yCo_{1-x-y}(OH)_2$, with $0<x\leq0.050$, $0<y\leq0.040$.

Example 2

A manganese (Mn), nickel (Ni), and aluminum (Al) substituted $LiCoO_2$ cathode powder was synthesized using a carbonate coprecipitation process to produce a carbonate precursor containing Al. The precursor was blended together and calcined with lithium carbonate ($Li_2CO_3$) at 1085° C. for 15 hours to form a cathode active material in a form of a powder. The cathode active material was then coated with nano-sized $Al_2O_3$ in an amount, for example, 1250 ppm by weight, and heat treated at elevated temperatures, such as 900° C.

A co-precipitation reaction was run in a 20-liter CSTR for a co-precipitation reaction at 1200 rpm and 55° C. A 1-molar metal aqueous solution containing manganese sulfate, cobalt sulfate and nickel sulfate was continuously added into the reactor at 0.2 liters/hour, and a 5-molar ammonium bicarbonate solution was also continuously added into the reactor to maintain pH at 7.5. After 24 hours. The final particles were washed, filtered and dried as a carbonate precursor. The carbonate precursor was converted to oxides at 400-800° C. for lithiation.

Coin Cell Electrochemical Performance

Figure 3:
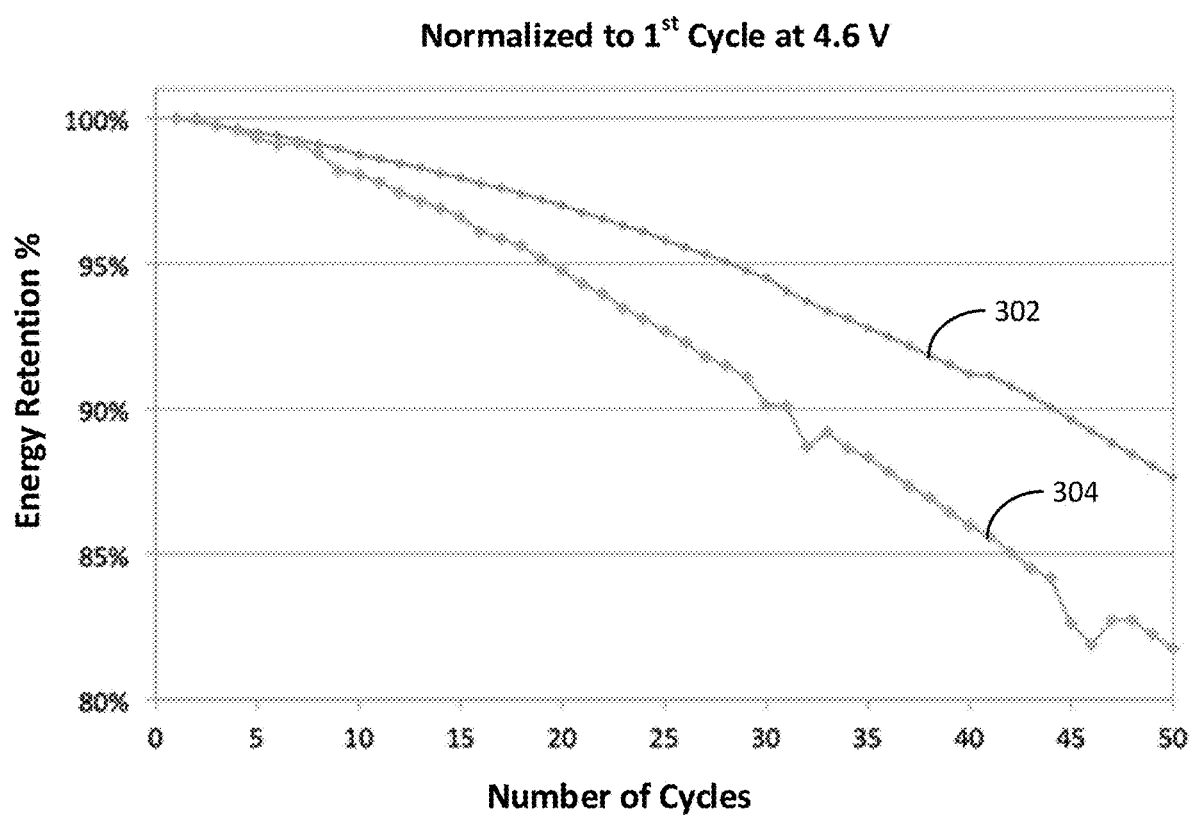
FIG. 3 shows the energy retention vs. cycles for the coin cell including a cathode active material represented by $Li_\alpha Co_{1-x-y-z}Me_w$ $Mn_xNi_yAl_zO\delta$, wherein $0.95 \leq \alpha \leq 1.05$, $0 < x \leq 0.050$, $0 < y \leq 0.040$, $0 < z \leq 0.070$, $0 \leq w \leq 0.020$, and $1.90 \leq \delta \leq 2.10$, wherein Me is selected from Zr, Mg, Ti, and a combination thereof, at 25° C. with a current density of C/5 and cycling at 4.6 V according to an embodiment of the disclosure.

FIG. 3 shows the energy retention versus cycles for the coin cell including a cathode active material represented by $Li_\alpha Co_{1-x-y-z}Me_w Mn_x Ni_y Al_z O_\delta$, wherein $0.95 \leq \alpha \leq 1.05$, $0 < x \leq 0.050$, $0 < y \leq 0.040$, $0 < z \leq 0.070$, $0 \leq w \leq 0.020$, and $1.90 \leq \delta \leq 2.10$, wherein Me is selected from Zr, Mg, Ti, and a combination thereof at 25° C. with a current density of C/5 and cycling at 4.6 V according to an embodiment of the disclosure. As shown, curve 302 represents normalized energy retention to the first cycle at 4.6 V at various cycles up to 50 cycles for the cathode active material represented by $Li_\alpha Co_{1-x-y-z}Me_w Mn_x Ni_y Al_z O_\delta$, wherein $0.95 \leq \alpha \leq 1.05$, $0 < x \leq 0.050$, $0 < y \leq 0.040$, $0 < z \leq 0.070$, $0 \leq w \leq 0.020$, and $1.90 \leq \delta \leq 2.10$, wherein Me is selected from Zr, Mg, Ti, and a combination thereof.

Curve 304 represents normalized energy retention to the first cycle at 4.6 V at various cycles up to 50 cycles for $LiCoO_2$. The cathode active material represented by $Li_\alpha Co_{1-x-y-z}Me_w Mn_x Ni_y Al_z O_\delta$ as described above has reduced energy retention when the number of cycles increases, but had the slope for decreasing less steeper than $LiCoO_2$. As such, the cathode active material including a narrow range of Ni, Mn and Al demonstrated better energy retention than the cathode active material $LiCoO_2$.

Table 1 lists the composition and particle sizes of Samples 1-9 having $LiCo_{1-x-y}M_x Ni_y O_2$, All Samples 1-9 had $Al_2O_3$ coating and a coating level of 0.05 wt %. The particle sizes were also determined before pressing. The composition of Mn and Ni in Table 1 are in mole. For example, Sample includes 0.04 mole Mn and 0.04 mole Ni.

The particle size distribution is determined by using a laser scattering technique. Using this method, a small amount of powder (e.g. about 1 g) is dispersed in water using ultrasonic vibration. This slurry is pumped through a glass cell where a laser is focused. The scattering of the laser is captured on a 2-D detector and the particle size is determined for individual particles assuming the particles have a spherical volume. The D50 is the median value of the particle size distribution. D90 is the 90% value of the largest particle size. D99 is the 99% value of the largest particle size. D10 is the 10% value of the largest particle size.

As shown in Table 1, Samples 1 and 6-9 had lower amounts of Mn and Ni, for example, within the claimed $0 < x \leq 0.050$ for Mn, and the claimed $0 < y \leq 0.040$ for Ni. In contrast, Samples 2-5 had higher amounts of Mn and Ni, for example, outside the claimed $0 < x \leq 0.050$ for Mn, and the claimed $0 < y \leq 0.040$ for Ni.

TABLE 1

|  | Mn | Ni | Calcination Temperature (° C.) | D10 (μm) | D50 (μm) | D90 (μm) |
|---|---|---|---|---|---|---|
| Sample 1-MN44 | 0.04 | 0.04 | 1070/15 hrs | 11.6 | 22.5 | 38.7 |
| Sample 2-MN1010 | 0.10 | 0.10 | 1050/15 hrs | 10.7 | 16.6 | 28.2 |
| Sample 3-MN77 | 0.07 | 0.07 | 1050/15 hrs | 13.4 | 20.8 | 31.7 |
| Sample 4-MN1616 | 0.16 | 0.16 | 1050/15 hrs | 8.8 | 15.2 | 26.3 |
| Sample 5-MN73 | 0.07 | 0.03 | 1050/15 hrs | n/a | n/a | n/a |
| Sample 6-MN33 | 0.03 | 0.03 | 1085/15 hrs | 14.3 | 26.6 | 43.7 |
| Sample 7 MN22 | 0.02 | 0.02 | 1085/15 hrs | 16.6 | 29.2 | 47.2 |
| Sample 8 MN32 | 0.03 | 0.02 | 1085/15 hrs | 15.0 | 29.1 | 48.1 |
| Sample 9 MN41 | 0.04 | 0.01 | 1085/15 hrs | 15.8 | 28.9 | 45.7 |

These samples were prepared at calcination temperature from 1050° C. for 15 hours, 1070° C. for 15 hours, or 1085° C. for 15 hours, as listed in Table 1.

Figure 4:
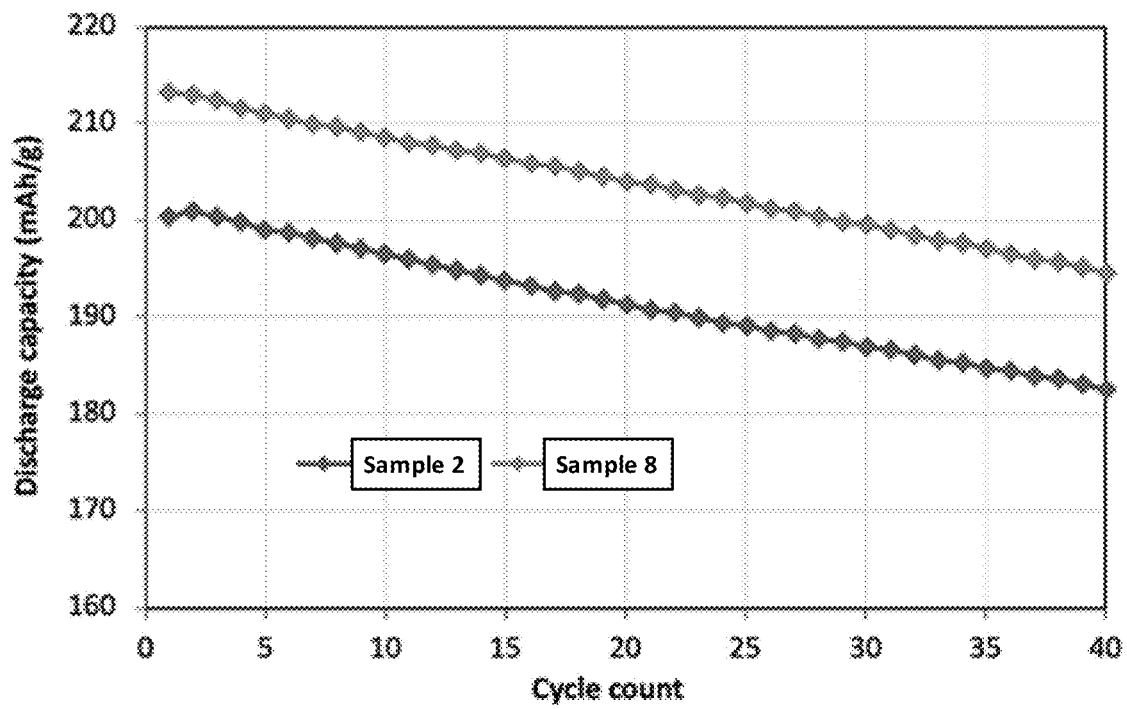
FIG. 4 illustrates the discharge capacity vs cycle counts for the coin cell including cathode active materials $LiCo_{0.95}M_{0.03}Ni_{0.02}O_2$ (Sample 8) and $LiCo_{0.80}M_{0.10}Ni_{0.10}O_2$ (Sample 2) according to an embodiment of the disclosure.

FIG. 4 illustrates the discharge capacity vs. cycle counts for the coin cell, including the cathode active materials $LiCo_{0.95}M_{0.03}Ni_{0.02}O_2$ (Sample 8) and $LiCo_{0.80}M_{0.10}Ni_{0.10}O_2$ (Sample 2), according to embodiments of the disclosure. The cathode active material represented by $LiCo_{0.95}M_{0.03}Ni_{0.02}O_2$ (lighter diamond) has reduced energy retention when the number of cycles increases, but had higher discharge capacity than $LiCo_{0.80}M_{0.10}Ni_{0.10}O_2$ (darker diamond). As such, the cathode active material including lower amounts of Mn and Ni, such as $LiCo_{0.95}M_{0.03}Ni_{0.02}O_2$, demonstrated higher discharge capacity than the cathode active material with higher amounts of Mn and Ni, e.g. $LiCo_{0.80}M_{0.10}Ni_{0.10}O_2$.

Figure 5:
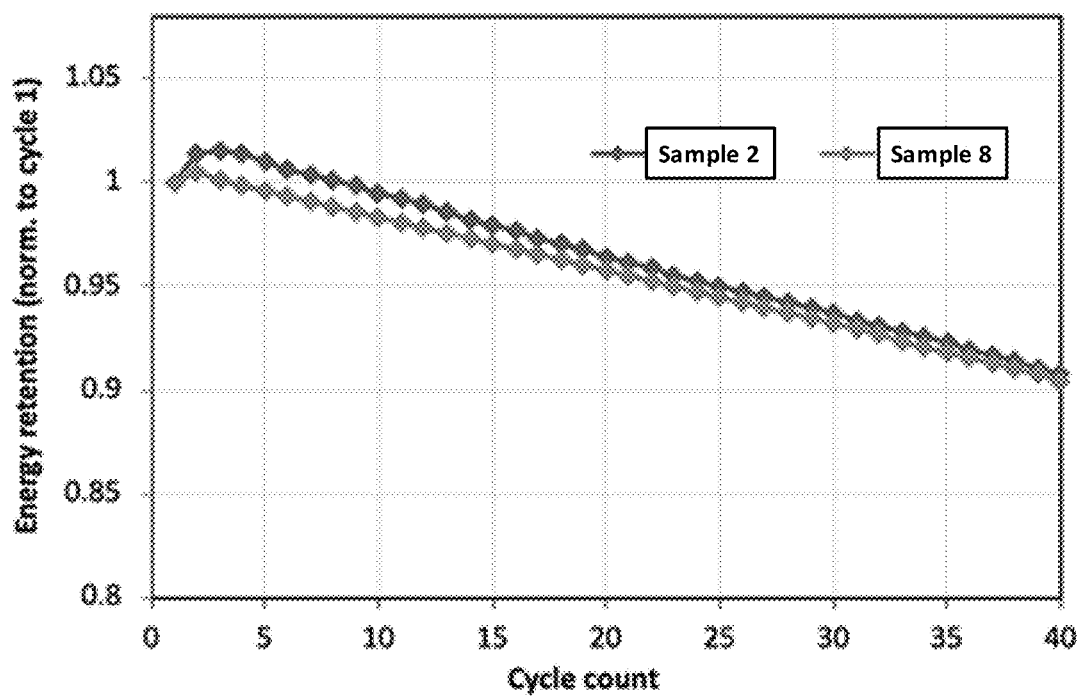
FIG. 5 illustrates energy retention versus cycle counts for the coin cell including cathode active materials $LiCo_{0.95}M_{0.03}Ni_{0.02}O_2$ (Sample 8) and $LiCo_{0.80}M_{0.10}Ni_{0.10}O_2$ (Sample 2) according to an embodiment of the disclosure.

FIG. 5 illustrates energy retention vs. cycle counts for the coin cell including the cathode active materials $LiCo_{0.95}M_{0.03}Ni_{0.02}O_2$ (Sample 8) and $LiCo_{0.80}M_{0.10}Ni_{0.10}O_2$ (Sample 2), according to embodiments of the disclosure. The cathode active material represented by $LiCo_{0.95}M_{0.03}Ni_{0.02}O_2$ has reduced energy retention when the number of cycles increases, but had the slope for decreasing less steeper than $LiCo_{0.80}M_{0.10}Ni_{0.10}O_2$. As such, the cathode active material including smaller amounts of Mn and Ni (e.g. $LiCo_{0.95}M_{0.03}Ni_{0.02}O_2$) demonstrated better energy retention than the cathode active material with higher amounts of Mn and Ni, e.g. $LiCo_{0.80}M_{0.10}Ni_{0.10}O_2$.

Table 2 lists the BET (Brunauer, Emmett and Teller) surface area and true densities for Samples 1-9. The BET surface area was determined before pressing.

TABLE 2

| | Sample | | | | | | | | |
|---|---|---|---|---|---|---|---|---|---|
| | 1 MN44 | 2 MN1010 | 3 MN77 | 4 MN1616 | 5 MN73 | 6 MN33 | 7 MN 22 | 8 MN32 | 9 MN41 |
| BET surface area (m²/g) | 0.12 | 0.197 | 0.212 | 0.207 | 0.29 | 0.121 | 0.121 | 0.12 | 0.111 |
| True Density (g/cc) | 5.03 | 4.96 | 4.92 | 4.85 | 4.88 | 5.01 | 5.01 | 5.01 | 5.00 |

It was surprising to discover that lower Mn and Ni amounts within the claimed 0<x≤0.050 for Mn, and the claimed 0<y≤0.040 for Ni would result in significantly lower BET surface area than samples with higher amounts of Mn and Ni outside the claimed 0<x≤0.050 for Mn, and the claimed 0<y≤0.040 for Ni. As shown in Table 2, Sample 1 and 6-9 also had the lowest BET surface area compared to Samples 2-5. Lower BET surface area can reduce the cathode powder surface activities with electrolytes, which may help extend battery's cycle life and thermal stability. In some embodiments, the BET surface area may correlate with energy retention. Lower BET surface area relates to higher energy retention.

As shown in Table 2, Sample 1 with lower contents, e.g. 0.04 mole Mn and 0.04 mole Ni had higher true density than Samples 2-5 that had higher mole Mn and Ni. Also, Sample 6-9 also had higher true density than Samples 2-5 that had higher mole Mn and Ni.

Figure 6:
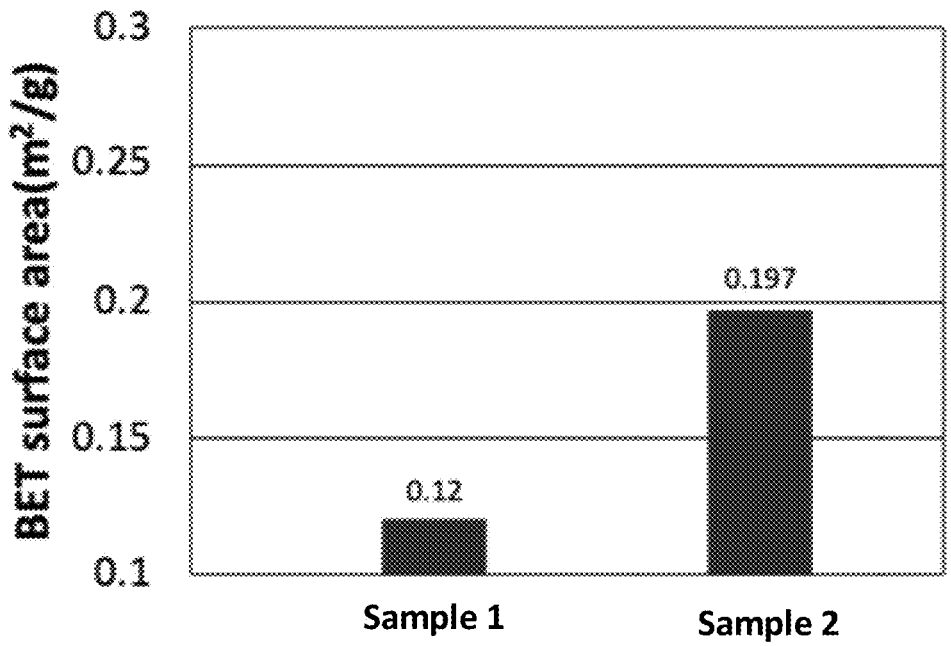
FIG. 6 illustrates comparison of BET surface areas for $LiCo_{0.92}M_{0.04}Ni_{0.04}O_2$ (Sample 1) and $LiCo_{0.80}M_{0.10}Ni_{0.10}O_2$ (Sample 2) according to an embodiment of the disclosure.

FIG. 6 illustrates comparison of BET surface areas for Samples 1 and 2, according to embodiments of the disclosure. As shown in FIG. 6, Sample 1 with 0.04 mole Mn and 0.04 mole Ni had a BET surface area of 0.12 m²/g. In contrast, Sample 2 with 0.10 mole Mn and 0.10 mole Ni had a BET surface area of 0.197 m²/g, which was significantly higher than Sample 1.

True density was measured with a Pycnometer (e.g. Quantachrome Ultrapyc 1200e with a temperature control option). The method includes weighing a powder sample in a micro cell, and recording a weight of the powder sample. The volume of the powder sample was measured with the Pycnometer such that the true density was obtained.

Figure 7:
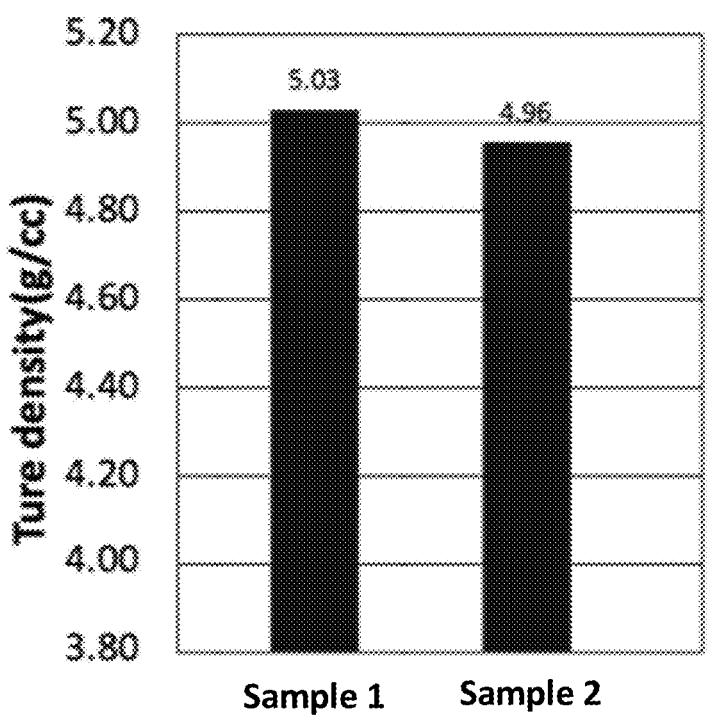
FIG. 7 illustrates comparison of true density for $LiCo_{0.92}M_{0.04}Ni_{0.04}O_2$ (Sample 1) and $LiCo_{0.80}M_{0.10}Ni_{0.10}O_2$ (Sample 2) according to an embodiment of the disclosure.

FIG. 7 illustrates comparison of true density for Samples 1 and 2, according to embodiments of the disclosure. As shown in FIG. 7, Sample 1 with 0.04 mole Mn and 0.04 mole Ni had a true density of 5.03 g/cc. In contrast, Sample 2 with 0.10 mole Mn and 0.10 mole Ni had a true density of 4.96 g/cc, which was lower than Sample 1. Higher true density may result in electrodes which may benefit volumetric energy density.

The coatings, powder, and cathode active materials can be used in batteries as described herein. The materials can be used in electronic devices. An electronic device herein can refer to any electronic device known in the art, including a portable electronic device. For example, the electronic device can be a telephone, such as a cell phone, and a land-line phone, or any communication device, such as a smart phone, including, for example an iPhone®, an electronic email sending/receiving device. The electronic device can also be an entertainment device, including a portable DVD player, conventional DVD player, Blue-Ray disk player, video game console, music player, such as a portable music player (e.g., iPod®), etc. The electronic device can be a part of a display, such as a digital display, a TV monitor, an electronic-book reader, a portable web-browser (e.g., iPad®), watch (e.g., AppleWatch), or a computer monitor. The electronic device can also be a part of a device that provides control, such as controlling the streaming of images, videos, sounds (e.g., Apple TV®), or it can be a remote control for an electronic device. Moreover, the electronic device can be a part of a computer or its accessories, such as the hard drive tower housing or casing, laptop housing, laptop keyboard, laptop track pad, desktop keyboard, mouse, and speaker. The battery and battery packs can also be applied to a device such as a watch or a clock. The components powered by a battery or battery pack can include, but are not limited to, microprocessors, computer readable storage media, in-put and/or out-put devices such as a keyboard, track pad, touch-screen, mouse, speaker, and the like.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

We claim:

1. A plurality of particles comprising a compound represented by Formula (I):

$$Li_\alpha Co_{1-x-y-z}Me_w Mn_x Ni_y Al_z O_\delta \qquad (I)$$

wherein 0.95≤α≤1.05, 0.005≤x≤0.050, 0.005≤y≤0.040, 0<z≤0.070, 0≤w≤0.020, and 1.90≤δ≤2.10;
wherein Me is Zr, and
wherein a BET surface area of an average particle is 0.111 to 0.121 m²/g.

2. The plurality of particles of claim 1, wherein the compound comprises Al from Al₂O₃ coating.

3. The plurality of particles of claim 1, wherein the compound comprises Al from doping for a core.

4. The plurality of particles of claim 1, wherein Me is from an oxide coating.

5. The plurality of particles of claim 1, wherein Me is from doping for a core.

6. The plurality of particles of claim 1, wherein x for Mn is from 0.010 to 0.035.

7. The plurality of particles of claim 1, wherein x for Mn is from 0.005 to 0.015.

8. The plurality of particles of claim 1, wherein y for Ni is from 0.010 to 0.030.

9. The plurality of particles of claim 1, wherein y for Ni is from 0.010 to 0.025.

10. The plurality of particles of claim 1, wherein y for Ni is from 0.010 to 0.015.

11. The plurality of particles of claim 1, wherein z for Al is equal to or less than 0.055.

12. The plurality of particles of claim 1, wherein z for Al is equal to or less than 0.035.

13. The plurality of particles of claim 1, wherein z for Al is equal to or less than 0.015.

14. The plurality of particles of claim 1, wherein w for Me is equal to or less than 0.015.

15. The plurality of particles of claim 1, wherein w for Me is equal to or less than 0.010.

16. The plurality of particles of claim 1, wherein w for Me is equal to or less than 0.005.

17. The plurality of particles of claim 1, wherein the BET surface area of an average particle is selected from 0.121 m²/g and 0.111 m²/g.

18. A cathode active material comprising the plurality of particles of claim 1.

19. A cathode comprising the cathode active material of claim 18.

20. A battery comprising:
a cathode of claim 19;
a separator; and
an anode.

21. A particle comprising
a core comprising a compound of Formula (II)

$$Li_\alpha CO_{1-s-t-u-v}Me_sMn_tNi_uAl_vO_\delta \quad (II)$$

and a coating comprising an oxide selected from $Al_2O_3$, $ZrO_2$, MgO, $TiO_2$, and a combination thereof;
wherein Me is Zr,
wherein $0.95 \leq a \leq 1.05$, $0 < t \leq 0.050$, $0 < u \leq 0.040$, $0 < v \leq 0.050$, $0 \leq s \leq 0.020$, and $1.90 \leq \delta \leq 2.10$, and
wherein a BET surface area of the particle is 0.111 to 0.121 m²/g.

22. The particle of claim 21, wherein Me or Al is from a doping material for the core.

23. The particle of claim 21, wherein t for Mn is from 0.010 to 0.035.

24. The particle of claim 21, wherein t for Mn is from 0.010 to 0.025.

25. The particle of claim 21, wherein t for Mn is from 0.005 to 0.015.

26. The particle of claim 21, wherein u for Ni is from 0.010 to 0.030.

27. The particle of claim 21, wherein u for Ni is from 0.010 to 0.025.

28. The particle of claim 21, wherein u for Ni is from 0.010 to 0.020.

29. The particle of claim 21, wherein u for Ni is from 0.010 to 0.015.

30. The particle of claim 21, wherein v for Al is equal to or less than 0.035.

31. The particle of claim 21, wherein v for Al is equal to or less than 0.025.

32. The particle of claim 21, wherein v for Al is equal to or less than 0.015.

33. The particle of claim 21, wherein w for Me is equal to or less than 0.010.

34. The particle of claim 21, wherein w for Me is equal to or less than 0.05.

35. A cathode active material comprising the plurality of particles of claim 21.

36. A cathode comprising the cathode active material of claim 35.

37. A battery comprising:
a cathode of claim 36;
a separator; and
an anode.

38. The particle of claim 21, wherein the BET surface area of the particle is selected from 0.121 m²/g and 0.111 m²/g.

* * * * *